United States Patent [19]
Carney et al.

[11] Patent Number: 5,100,221
[45] Date of Patent: Mar. 31, 1992

[54] OPTICAL FIBER CABLE DISTRIBUTION FRAME AND SUPPORT

[75] Inventors: William V. Carney, Oyster Bay; Carl Meyerhoefer, Dix Hills, both of N.Y.

[73] Assignee: Porta Systems Corp., Syosset, N.Y.

[21] Appl. No.: 468,352

[22] Filed: Jan. 22, 1990

[51] Int. Cl.$^5$ .......................... G02B 6/26; G02B 6/36; G02B 6/40
[52] U.S. Cl. ...................................... 385/135; 385/53
[58] Field of Search .................... 350/96.20–96.22, 350/96.10

[56] References Cited

U.S. PATENT DOCUMENTS

| | | | |
|---|---|---|---|
| 3,020,450 | 2/1962 | Shafer | 317/99 |
| 4,266,853 | 5/1981 | Hutchins et al. | 350/96.20 |
| 4,359,262 | 11/1982 | Dolan | 350/96.20 |
| 4,373,776 | 2/1983 | Purdy | 350/96.20 |
| 4,418,982 | 12/1983 | Williams | 350/96.20 |
| 4,428,645 | 1/1984 | Korbelak | 350/96.20 |
| 4,500,166 | 2/1985 | Kunze | 350/96.20 |
| 4,627,686 | 12/1986 | Szentesi | 350/96.20 |
| 4,708,430 | 11/1987 | Donaldson et al. | 350/96.20 |
| 4,722,585 | 2/1988 | Boyer | 350/96.20 |
| 4,752,110 | 6/1988 | Blanchet et al. | 350/96.20 |
| 4,765,708 | 8/1988 | Becker et al. | 350/96.20 |
| 4,765,709 | 8/1988 | Suillerot et al. | 350/96.20 |
| 4,765,710 | 8/1988 | Burmeister et al. | 350/96.20 |
| 4,770,357 | 9/1988 | Sander et al. | 242/54 R |
| 4,792,203 | 12/1988 | Nelson et al. | 350/96.20 |
| 4,824,196 | 4/1989 | Bylander | 350/96.20 |
| 4,834,486 | 5/1989 | Walker | 350/96.20 |

FOREIGN PATENT DOCUMENTS 117513 6/1983 Japan.
74523 3/1984 Japan.

OTHER PUBLICATIONS

Lightguide F83AK8567 Lightguide Stranded Cable Interconnection Equipment, AT&T Data Sheet (2pp.), Jul. 1984.
Lightguide: A Total Linkage and Transport System (pp. 6-32,-6-33) Nov. 1, 1988.
AT&T 636-299-103-5 Instruction Sheet, (pp. 1, 7, 14) Jul. 1988.
Lightguide Interconnection Cables, Build-Outs, and Connectors Description and Use Digital Transmission Systems, AT&T 365-302-102 (pp. 1-31) Jul. 1984.
Presentation to Fiber Optics Conference, 1980 (p. 7) (Taken from AT&T Issue 2 Practice 365-302-102).
Siecor Cabinet-Mounted Interconnect Center, Siecor Corporation (4 pages) Copyright 1987.
Bell System Cable Interconnect Equipment, Central Office to Customer Premises, Manfred R. Gotthardt, Proceedings of the 32nd International Wire and Cable Symposium, Nov. 15-17, 1983.

*Primary Examiner*—Akm Ullah
*Attorney, Agent, or Firm*—Fitzpatrick, Cella, Harper & Scinto

[57] ABSTRACT

Adaptive racking and distribution frame systems for handling optical fiber cables and including racking sections with wall portions that can be replaced without removing the section or displacing cables in the section and further including housings with moveable shelves that can be adapted to hold optical fiber splices, optical fiber connectors or optical fiber storage spools.

19 Claims, 17 Drawing Sheets

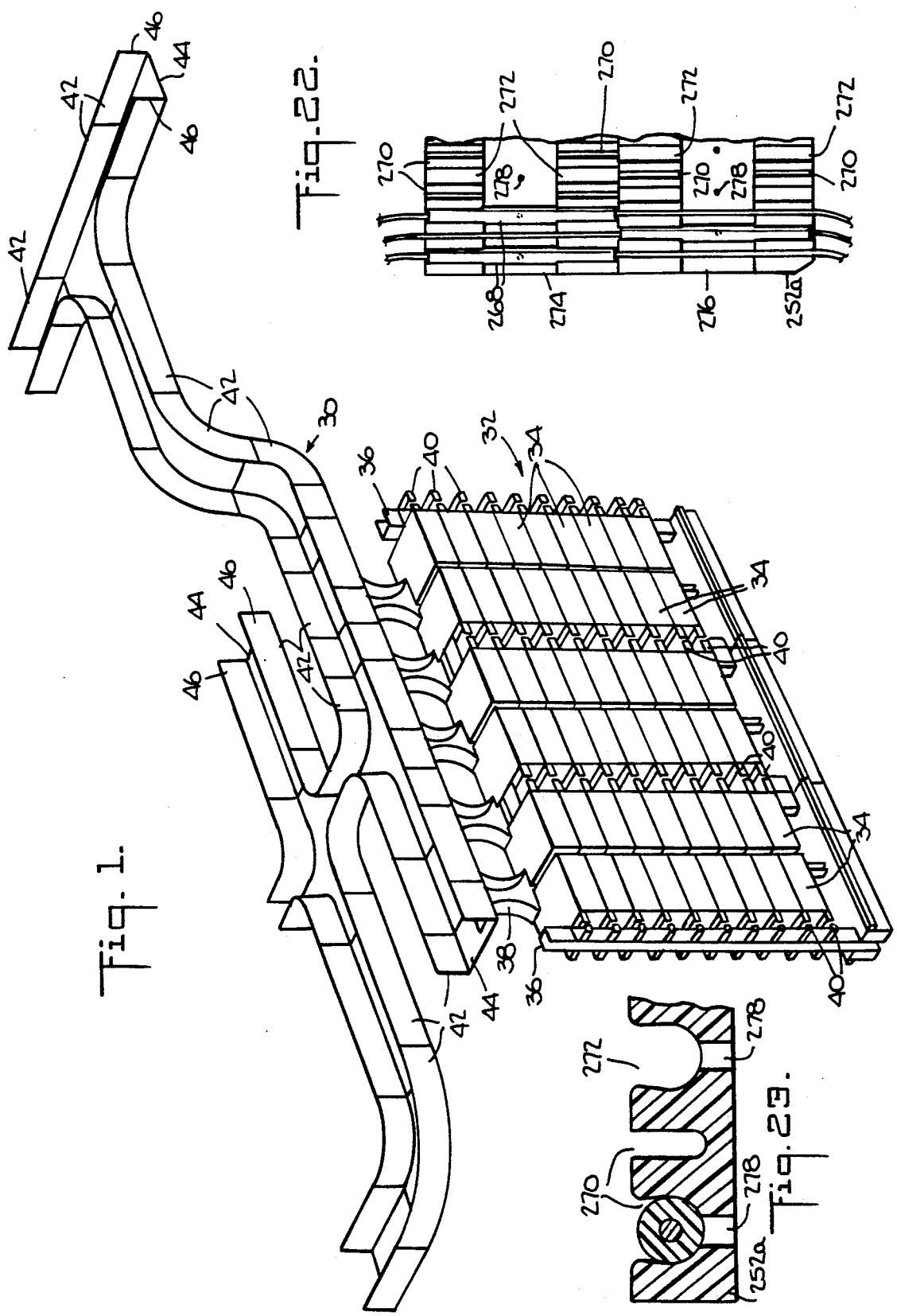

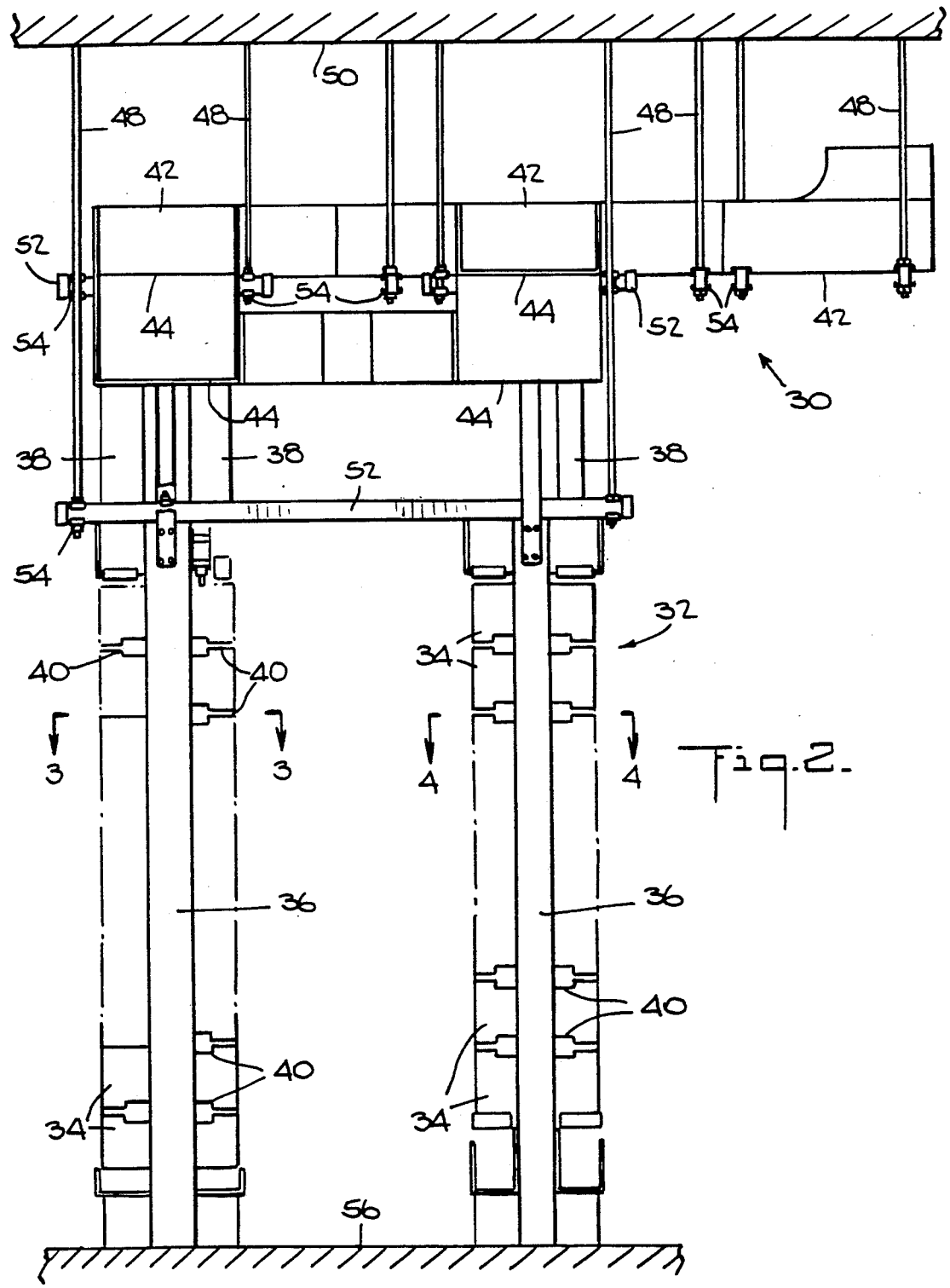

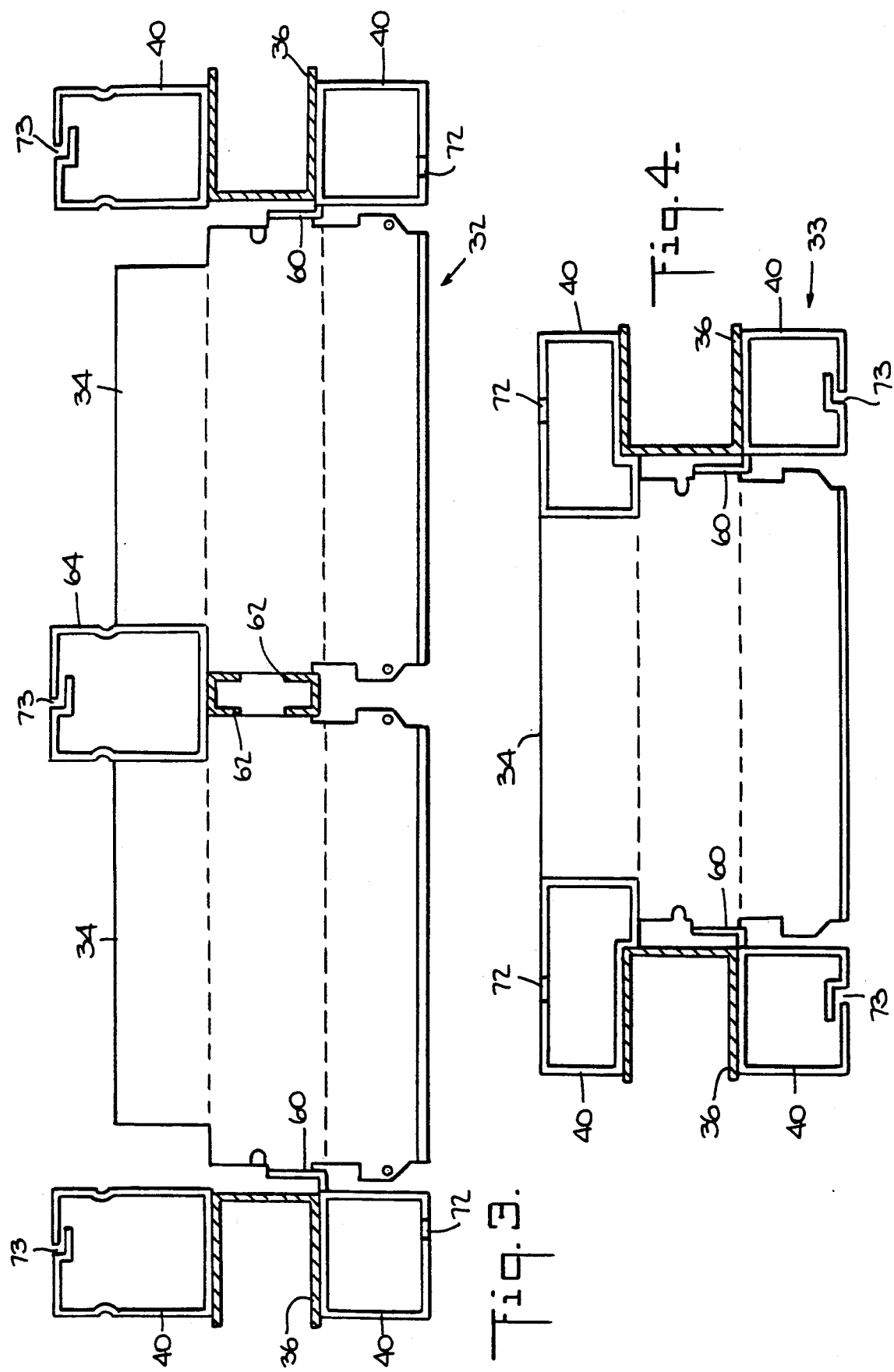

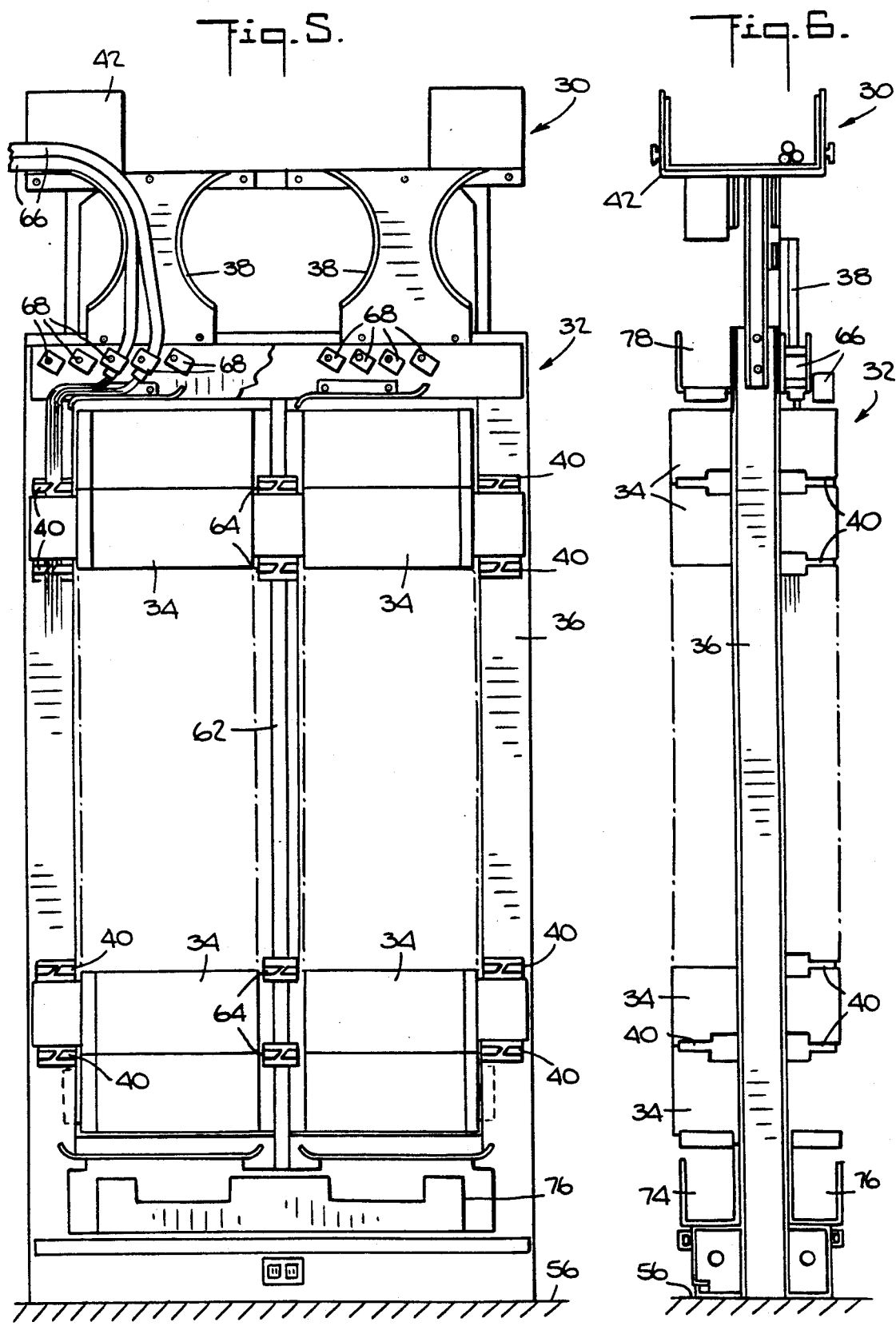

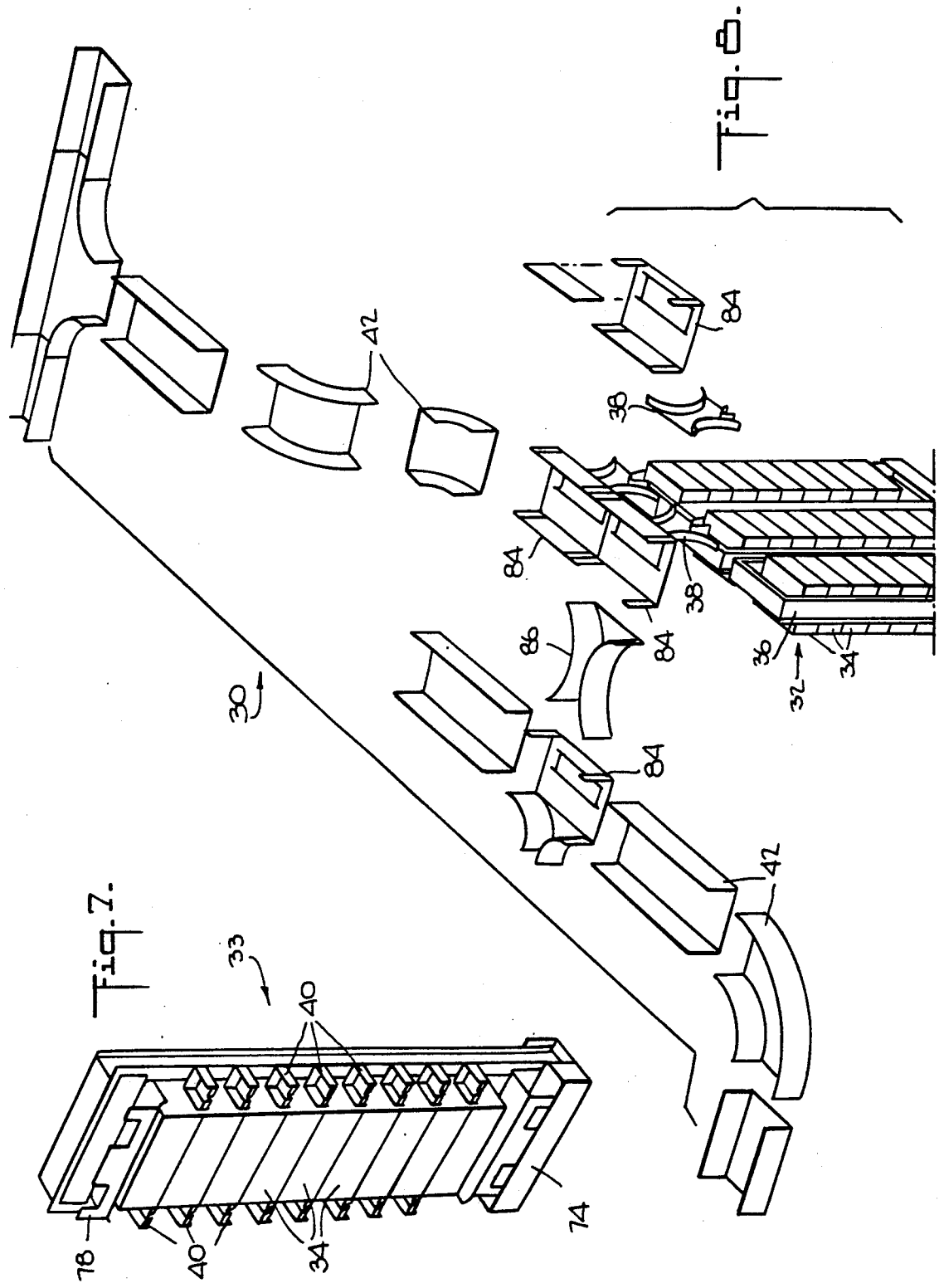

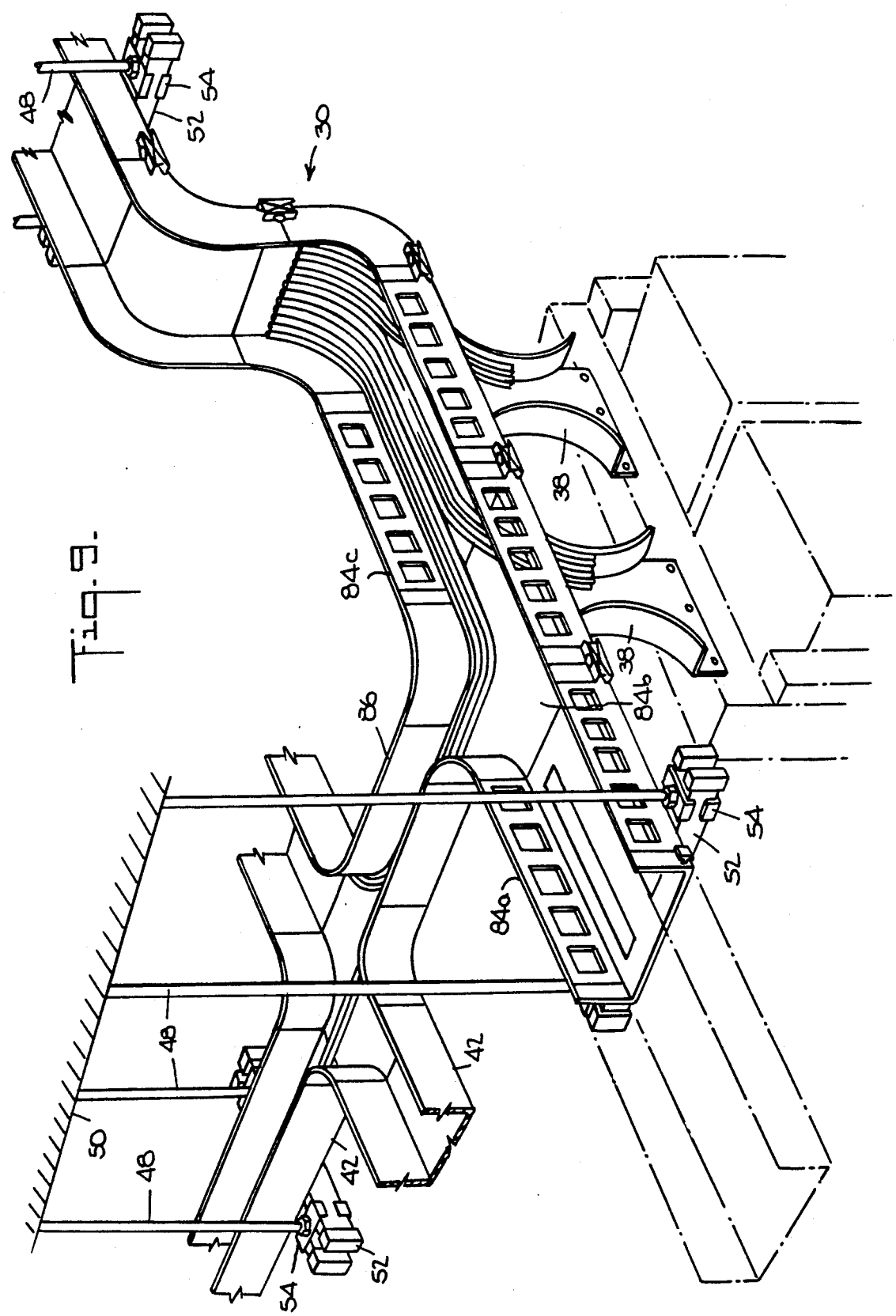

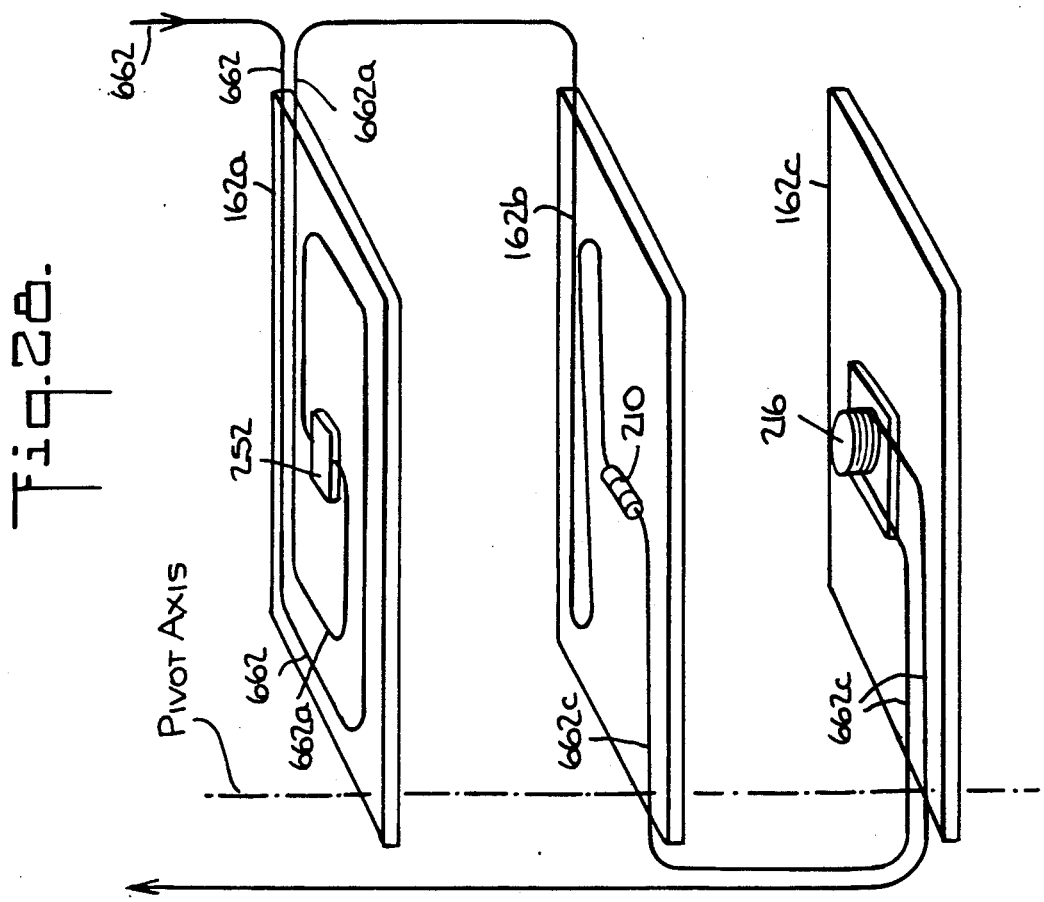
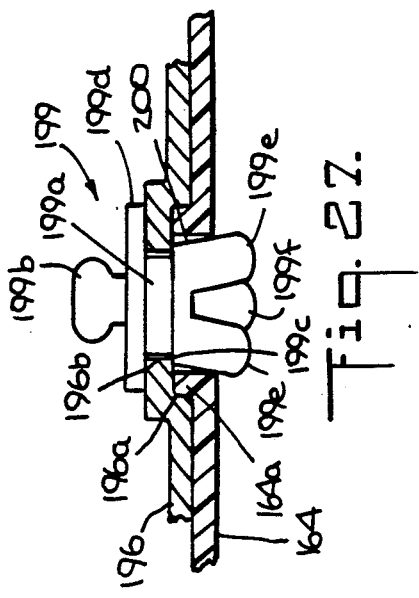
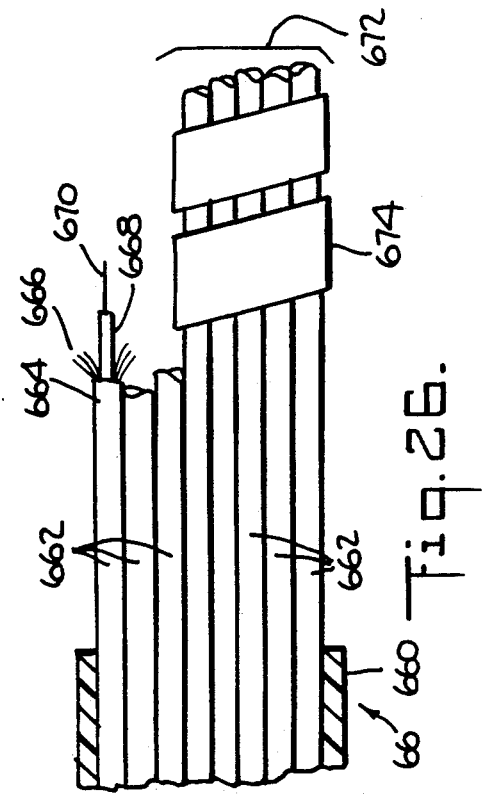

OPTICAL FIBER CABLE DISTRIBUTION FRAME AND SUPPORT

BACKGROUND OF THE INVENTION

1. Field of the Invention

This invention relates to arrangements for supporting optical fiber cables and more particularly it concerns novel optical fiber racking and distribution frame systems having housing assemblies for supporting optical fiber cables in a manner which protects the cables from harmful bending and at the same time allows a large number of such cables to be readily accessed for connecting, splicing and for storage.

2. Description of the Prior Art

It is known to construct optical fiber distribution frames by providing cable connectors, cable splice supports and cable storage spools inside stacked box-like housings and to feed optical fiber cables between an overhead cable racking system and the housings. It is also known to mount the cable connectors, cable splice supports and cable storage spools in trays which are pivotally mounted in a housing to swing from an enclosed portion within the housing to an access position substantially outside the housing. A single swingable tray may be provided with cable connectors, cable splice supports and cable storage spools or it may be provided with only one or two of these different types of cable handling means. Examples of such arrangements are described in U.S. Pat. Nos. 4,765,710, 4,792,203 and 4,824,196.

There are certain problems associated with the handling of optical fiber cables. Firstly, it is important that they be properly supported to extend along predetermined paths and that they be protected from sharp bends; otherwise their signal transmission capabilities will be severely reduced. Secondly, optical fiber cables are generally used in high density environments, such as telephone exchanges and, accordingly, large numbers of cables must be handled in as small a space as possible. Thirdly, because facilities which use fiber optic cables are often modified and expanded, it is necessary that the installation in which they are mounted itself be adaptable to modification.

SUMMARY OF THE INVENTION

The present invention, in one of its aspects, provides a novel adaptive optical fiber cable racking system and novel racking system members which permit modification and expansion so that cables already in the system or new cables can be directed to existing or added equipment without disturbing other cables in the racking system.

The novel racking system comprises a plurality of trough-like structures each having a flat bottom wall and side walls extending upwardly from along opposite side edges of the bottom wall. Each trough-like structure is open at its ends and the cross-section of each trough-like structure matches an adjacent trough-like structure. Connectors are formed near the ends of each trough-like structure for connecting same end to end to an adjacent trough-like structure to form a continuous support for optical fiber cables positioned therein. At least one of the trough-like structures has a wall with a portion which is removable from the remainder of the side wall independently of the connectors.

According to another aspect of the invention there is provided a novel trough-like structure as above described for use in an optical fiber racking system.

According to a further aspect of the invention there is provided a novel adaptive housing for use in an optical fiber distribution frame system. This novel housing comprises a box-like member open along its front and a plurality of shelves arranged in stacked array in the member and mounted for individual movement through the open front from an enclosed position within the member to the access position substantially outside the member. Each of the shelves is of substantially the same configuration and each shelf has formations for removably securing different types of optical fiber cable supports to the shelf.

In another aspect, the invention provides a novel optical fiber cable support assembly which comprises a housing of box-like configuration and open at the front and a shelf mounted on the housing to pivot about an axis which extends along one side of the front of the housing to move from an enclosed position inside the housing to an access position substantially fully outside the housing. The housing is formed with an optical fiber cable opening located substantially diagonally across the housing from the shelf pivot axis. A cable abutment formation is provided on the shelf at a location which, when the shelf is in its enclosed position, is farther from the front of the housing than a line extending from the shelf pivot axis to the optical fiber cable opening. When an optical fiber cable on the shelf passes around the side of the abutment formation and extends therefrom directly to the optical fiber cable opening in the housing, the optical fiber cable automatically unwinds off from and rewinds on to the abutment as the shelf is pivoted to its access position and back to its enclosed position. Thus, the optical fiber cable is held in substantially a straight line between the abutment and the opening and is not allowed to bend in an uncontrolled manner.

According to a still further aspect of the invention there is provided a novel optical fiber cable distribution system which comprises a plurality of optical fiber cable housings arranged in a stacked array and first and second vertical cable guides arranged to extend vertically along opposite sides of the stacked array. At least one of the housings contains optical fiber cable inlet and outlet openings on opposite sides. A first optical fiber cable extends from the first vertical cable guide to the inlet opening on one side of the housing and a second optical fiber cable extends from the outlet opening in the other side of the one housing to the second vertical cable guide.

In another aspect, the present invention provides a novel optical fiber cable distribution system which comprises a plurality of optical fiber cable housings arranged in stacked array. First and second vertical cable guides are arranged to extend vertically along opposite sides of the stacked array of housings. At least one of the housings contains optical fiber cable inlet and outlet openings on opposite sides. A horizontal optical fiber cable guide is located above the stacked array of housings. Intermediate optical fiber cable guides extend between the upper ends of the vertical cable guides and the horizontal optical fiber cable guide. A first optical fiber cable extends from the horizontal cable guide and through an associated intermediate cable guide and one of the vertical cable guides to the cable inlet opening in one of the housings and a second optical fiber cable extends from a cable outlet opening in at least one of the housings and through the other vertical cable guide to the horizontal cable guide.

In yet another aspect, the present invention provides a novel optical fiber cable distribution system which comprises a plurality of optical fiber cable housings arranged in two side by side stacked arrays. First and second vertical cable guides are arranged to extend vertically along the outer sides of the housings near the fronts thereof. A third vertical cable guide is arranged to extend vertically along the mutually adjacent sides of the housings near the rear thereof. At least one of the housings contains optical fiber cable inlet and outlet openings on opposite sides thereof. Optical fiber cables extend from the third vertical cable guide to at least one of the housings in each array and further optical fiber cables extend from the one housing in each array to the first and second vertical cable guides, respectively.

In a still further aspect, the present invention provides a novel tray for holding optical fiber cable splices. This novel tray comprises a flat expansive bottom wall and an upright vertical circumferential wall extending up from the bottom wall at a location inwardly from its outer edges. The circumferential wall is formed with an opening to permit optical fiber cables to pass through to the region surrounded by the wall, and an optical fiber cable splice holder mounting is located within the enclosed region.

BRIEF DESCRIPTION OF THE DRAWINGS

FIG. 1 is a perspective view of an optical fiber distribution frame and racking system in which the present invention is embodied;

FIG. 2 is a vertical elevational view taken along line 2—2 of FIG. 1;

FIG. 3 is an enlarged cross-sectional view taken along line 3—3 of FIG. 2;

FIG. 4 is an enlarged cross-sectional view taken along line 4—4 of FIG. 2;

FIG. 5 is an elevational view taken along line 5—5 of FIG. 4;

FIG. 6 is an elevational view taken along line 6—6 of FIG. 5;

FIG. 7 is a perspective view of the optical fiber distribution frame of FIG. 4;

FIG. 8 is an exploded perspective view of an optical fiber racking arrangement in which the present invention is embodied;

FIG. 9 is a view similar to FIG. 8 but showing the assembly of the elements of the optical fiber racking arrangement;

FIG. 22 is an enlarged fragmentary plan view of an optical fiber splice holder used in the shelf of FIGS. 19-21;

FIG. 23 is an enlarged cross-sectional view taken along line 23—23 of FIG. 22;

FIG. 26 is a side section view showing the construction of an optical fiber feeder cable which contains optical fiber cables and subgroups thereof and which can be accommodated in the optical fiber cable racking and distribution frame systems of the present invention;

FIG. 27 is an enlarged fragmentary section view taken along line 27—27 of FIG. 15; and FIG. 28 is a diagrammatic perspective view showing an optical fiber circuit which may be used in the distribution frame system of the present invention.

DETAILED DESCRIPTION OF THE PREFERRED EMBODIMENTS

Figure 10:
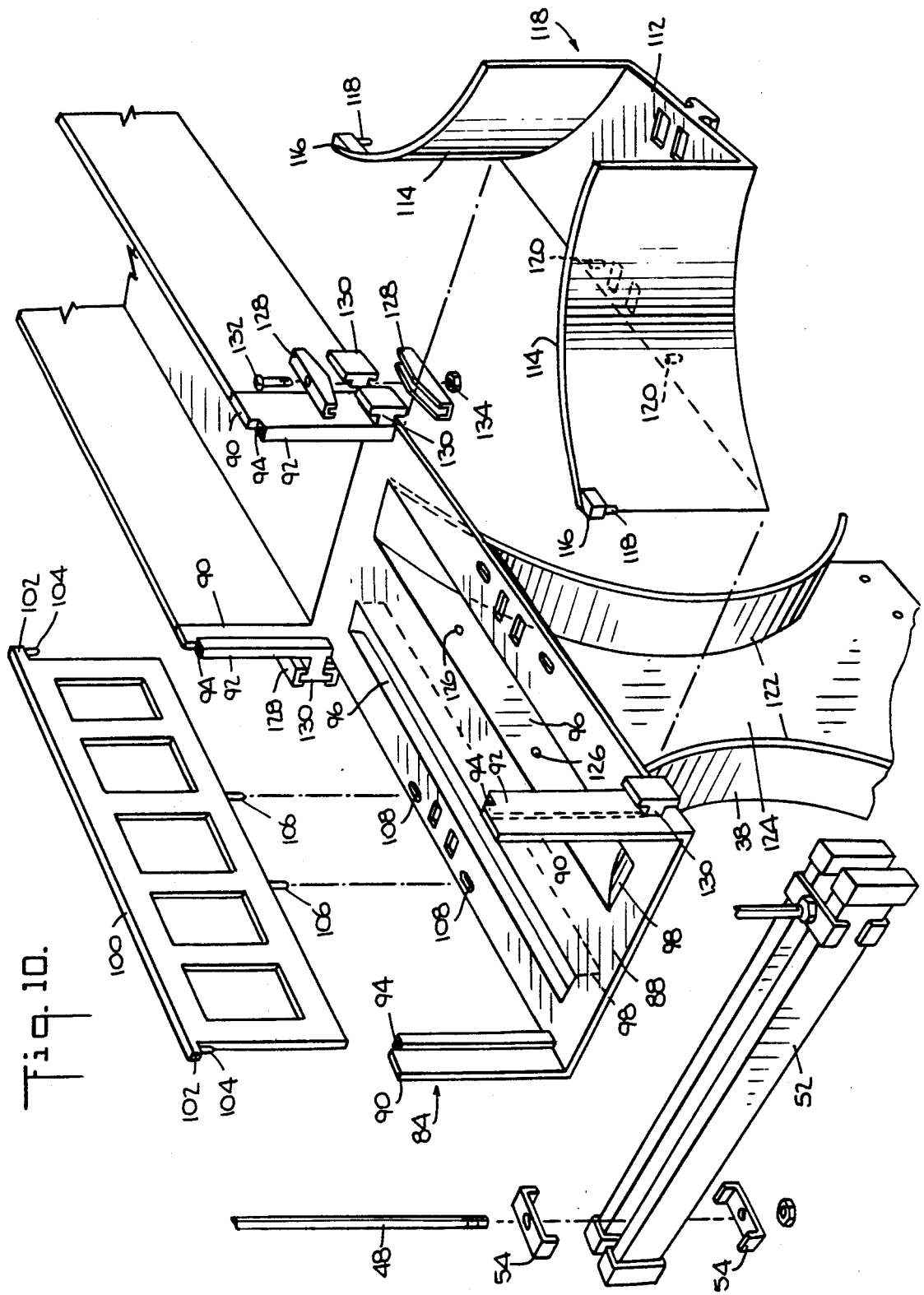
FIG. 10 is an exploded perspective view showing the construction and assembly of an optical fiber cable support member forming one part of the racking arrangement of FIGS. 8 and 9.

Referring first to FIG. 1, there are shown an optical fiber racking system 30 and distribution frame system 32 of the type which may be used in telephone office central stations. The racking system 30 is composed of trough-like support elements in which optical fiber cables (not shown) are supported. The distribution frame system 32 is positioned below the racking system and contains groups of vertically stacked housings 34 of which are supported by spaced apart vertically extending frame members 36. As will be described more fully hereinafter, the housings 34 contain arrangements for connecting, splicing and storing optical fiber cables. The optical fiber cables extend to and from remote equipment (not shown), such as outside plant equipment, test equipment, individual subscriber lines, etc.; and they are supported and directed by the racking system 30 to locations above the distribution frame system 32 as well as to locations above other distribution frame systems. The optical fiber cables are then guided via intermediate cable guides 38 to vertical cable guides 40 which extend along the sides of the housings 34; and from there the optical fiber cables pass into and out from the housings 34.

The racking system 30 is made up of trough-shaped elements 42 which have a flat bottom wall 44 and side walls 46 extending up from the side edges of the bottom wall. The elements 42 are open at their ends and they fit together end to end to form a continuous support trough. The particular shape of the racking system support trough is determined according to the specific application and physical layout of the plant or other location where the system is to be used. What is required is that there be provided good bottom support for the cables and that all changes in direction of the cables be sufficiently gentle to avoid harmful bending. As can be seen, the various trough shaped elements 42 include both vertical and horizontal bends and some of the elements are formed as Tee's to permit crossover of various ones of the optical fiber cables to portions of the racking system which extend over other distribution frame systems such as the distribution frame systems 32 and 33 shown in FIG. 2. It will also be noted that the intermediate cable guides 38 extend down from the bottom walls of various trough shaped elements.

As shown in FIG. 2, the racking system 30 is supported by vertical support rods 48 which extend down from a ceiling 50. The lower ends of the support rods 48 pass through cross beams 52 which in turn extend under the bottom walls 44 of various trough shaped elements 42. The lower ends of the support rods 48 are threaded and are held to the cross beams 52 by means of threaded clamp elements 54.

The lower ends of the vertically extending frame members 36 are supported on a floor 56. Upper support members 58 extend from the upper portions of the frame members 36 to provide additional support to the racking system 30.

As can be seen in FIGS. 1 and 2, the housings 34 extend between and are supported by adjacent vertically extending frame members 36. The housings 34 may be arranged, as shown in FIG. 3, in two side by side stacks between adjacent frame members 36 or, in an alternate arrangement, the housings 34 may be arranged as shown in FIG. 4, in a single stack between adjacent vertically extending frame members 36. In both cases angle brackets 60 are bolted to the frame members 36 and to the housings 34 to mount the housings on the frame members. In the case of side by side housing stacks, as shown in FIG. 3, intermediate vertical frame members 62 extend between the adjacent stacks of housings 34 and the housings are individually bolted to these intermediate frame members. The vertically extending frame members 36 have a U-shaped cross section; and the vertical cable guides 40, which are spaced apart along the length of the vertical frame members between adjacent vertically spaced housings 34, are attached to the flange portions of the frame members. It will be seen that in the double stack housing arrangement of FIG. 3 the vertical cable guides 40 are positioned on opposite sides of each of the vertical frame members 36 so that they extend along the front and rear outer edges of the housings 34. Intermediate vertical cable guides 64 extend between the adjacent groups of housings 34 along the rear edges thereof and these intermediate vertical cable guides are bolted to the intermediate vertical frame members 62. In the single stack housing arrangement of FIG. 4 the vertical cable guides 40 are arranged in a similar manner to those of FIG. 3 except that no intermediate cable guides are provided.

FIGS. 5 and 6 show, respectively, the rear and one side of the distribution frame system 32. As shown in FIG. 5, optical fiber feeder cables 66, which extend along the racking system 30 from and to outside plant equipment, curve down along the intermediate cable guides 38 to cable clamps 68 at the upper end of the distribution frame system 32 where they are clamped in place.

FIG. 26 shows a typical optical fiber feeder cable construction. It should be understood that there are many variations of this construction and it will be readily apparent to those skilled in the art, based on the description herein, how each of such variations may be used with the present invention. For purposes of illustration however, the invention will be described as used with a cable construction as shown in FIG. 26. As shown therein, the optical fiber feeder cable 66 contains, within an outer jacket 660, a plurality of subcables 662 (hereinafter "optical fiber cables"). Each optical fiber cable 662 has an outer jacket 664 with a fibrous dielectric liner 666 which surrounds an optical fiber buffer cable 668. The optical fiber buffer cable 668 in turn comprises an outer coating which surrounds an optical fiber 670. The optical fiber 670, as is well known, comprises a glass core and outer sheath of different indices of refraction; and this construction enables the optical fiber to transmit electromagnetic waves which are in or close to the visible spectrum.

Since the outer jacket 660 of the feeder cable 66 is terminated at the cable clamp 68, various subgroups 672 of the optical fiber cables 662 are held together by means of a spiral plastic wrap 674.

The present invention is also used with "jumper" cables and "pigtail" cables. The basic construction of these cables may be the same as the optical fiber cables 662, the only difference being that a pigtail cable has a splice at one end and a connector at the other end and a jumper cable has a connector at both ends. In the following description, except where otherwise specified, jumper cables and pigtail cables will both be referred to as "optical fiber cables".

The outer jacket 660 of each optical fiber feeder cable 66 is stripped away at its respective cable clamp 68 and the thus exposed optical fiber cables 662 of the feeder cable 66 are guided from the clamps 68 down through the vertical cable guides 40 along the back side of the distribution frame 32. As will be described in greater detail hereinafter, various ones of the optical fiber cables 662 are directed from the vertical cable guides 40 to assigned housings 34. Similarly, optical fiber cables guides 64 and through the intermediate cable guides 38 to the racking system 30. It will be seen that the vertical cable guides 40 and the intermediate vertical cable guides 64 have diagonal slits 72 or overlapping portions 73 (FIGS. 3 and 4) in their outer portion to permit insertion of the optical fiber cables 662.

In addition there are provided front and rear lower horizontal troughs 74 and 76 along the bottom of the distribution frame system 32 as well as an upper horizontal trough 78 along the top of the distribution frame system to guide optical fiber cables 662 between adjacent stacks of housings 34 in the distribution frame system 32 or between the housings of adjacent distribution frame systems.

As shown in FIG. 1, the intermediate cable guides 38 are arranged over the rear side of the distribution frame system 32; and where high density cable handling is needed, the cable clamps 68 are mounted on two parallel clamp support panels 80 and 82 positioned above the uppermost housing.

The single distribution frame system 33 of FIG. 4 is also provided with front and rear horizontal lower troughs 74 and 76 and a front upper horizontal trough 78 below and above the housings 34 and vertical cable guides 40 along the opposite sides of the housings, as shown in the perspective view of FIG. 7.

The manner in which the racking system 30 is constructed is shown in FIG. 8. As can be seen, the racking system is made up of individual trough-shaped elements 42, each having a flat bottom wall 44 with flat side walls 46 extending up from the opposite edges of the bottom wall. The ends of the elements 42 are open and adjacent elements have matching cross sections so that they can be connected together to form a continuous supporting trough. As can be seen, some of the elements 42a are straight while others 42b curve in a horizontal plane and still others 42c curve in a vertical plane. Still other elements, e.g. 42d, form a Tee. In each instance where a trough element 42 curves, either in the horizontal plane or in the vertical plane, the curve is gradual in order to prevent bending of the feeder cables 66 (and optical fiber cables 662) to a sharp radius which would destroy their fiber optic transmission characteristics.

As shown in FIG. 8, the racking system 30 includes novel adaptive trough elements 84 which can be modified to serve either as straight trough sections, Tee sections, intermediate cable guide connections or as both Tee sections and intermediate cable guide connections. The adaptive trough elements 84 are located above the distribution frame systems 32 and 33 and they serve to guide feeder cables 66 (and optical fiber cables 662) via the intermediate cable guides 38 to and from the associated distribution frame systems. The adaptive trough elements 84 also serve to guide feeder and optical fiber cables via cross aisle sections 86 to and from racking system elements located above other distribution frame systems. The racking system 30 thus guides feeder cables 66 and optical fiber cables 662 between any number of distribution frame systems 32 and/or 33 as well as between the distribution frame systems and outside plant equipment.

The construction of the adaptive trough elements 84 is best seen in FIGS. 9 and 10. In FIG. 9 three adaptive trough elements 84a, 84b and 84c are arranged in line. The left trough element 84a is a straight section and simply directs feeder cables 66 and/or optical fiber cables 662 straight along the racking system. The right trough element 84c provides an interconnection to an intermediate cable guide 38. The center trough element 84b provides both an interconnection to an intermediate cable guide 38 and a Tee connection to a cross aisle section 86. The ability of the adaptive trough element 84 to accommodate these different functions is achieved by its novel construction wherein different portions thereof can be readily removed and replaced by other portions of different configuration.

As shown in FIG. 10, the adaptive trough element 84 comprises a rectangular base portion 88 with side wall elements 90 extending up from the side edges of the base portion near its ends. Pillars 92 extend up along the side wall elements to a location slightly below their upper edges and mounting holes 94 are formed in the upper ends of the pillars. Parallel rectangular openings 96 are formed in the base portion 88 and flanges 98 extend down from the elongated edges of these openings. A straight side wall section 100 is provided to extend along one side of the base portion between the side wall elements 90. The straight side wall section 100 is formed at its upper corners with lugs 102 which fit over the pillars 92; and mounting pins 104 which extend down from the lugs and fit into the mounting holes 94 in the pillars. In addition, mounting pins 106 extend down from the lower edge of the wall section 100 and fit into openings 108 along the edge of the base portion 88 to hold the wall section in place. When the wall section 100 is in place it forms a straight section on its side of the trough element 84. However, the wall section 100 can easily be removed and replaced by another section to convert the trough element 84 to a different configuration. As shown in FIG. 10, there is provided on the opposite side of the base portion 88 an integral one piece Tee section 110 having a flat bottom wall 112 and a pair of converging curved side walls 114. The divergent ends of the side walls are formed with lugs 116 and pins 118 at their upper corners to fit into the mounting holes 94 in the pillars 92 at each end of the base portion 88. Additional pins 120 along the wide edge of the bottom wall 112 fit into openings 108 near the edge of the base portion 88. It will be appreciated that the Tee section 110 can be mounted to the base portion in the same manner as the wall section 100; and when the Tee section is in place it provides a gently curved guide for directing fiber optic cables to a cross aisle section.

The intermediate cable guide 38, as shown in FIG. 10, comprises a pair of downwardly extending curved support elements 122 and a flat vertical wall section 124 which extends between one edge of the elements 122. The upper portion of the wall section 124 rests against one of the flanges 98 extending down from one of the rectangular openings 96 in the base portion 88 and is bolted to the flange as shown at 126. This secures the intermediate cable guide 38 to the adaptive trough element 84. When the intermediate cable guide 38 is so secured in place, its curved support elements 122 merge with the opposite narrow ends of the opening 96 in the base portion 88. Thus, feeder cables 66 and optical fiber cables 662 extending along the base portion are guided along a gently curved path from a horizontal direction in the adaptive trough element 84 to a vertical direction in the intermediate cable guide 38 toward the underlying distribution frame system 32 or 33. The feeder cables and optical fiber cables are preferably enclosed in the intermediate cable guide 38 by means of a cover (not shown) which extends parallel to the wall section 124 along the edge of the curved support elements 122 opposite from the wall section 124. The cover may be held in place by any convenient fastening means, for example flanges with detents which extend over corresponding projections (not shown) in the support elements.

FIG. 10 also shows the manner in which the adaptive trough element 84 is connected to other trough elements 42. As shown, the trough elements have T-shaped projections 130 formed on their outer surfaces near their ends. When two trough elements are positioned next to each other in alignment, these T-shaped projections on the adjacent trough elements are located next to each other as shown in FIG. 10. Upper and lower clamp elements 128 of U-shaped cross section are fitted over the arms of the T-shaped projections 130 and are clamped in place by means of a bolt 132 and nut 134. Similar T-shaped projections 136 are provided along the bottom wall of the various trough elements 42 and 84 and are clamped together in the same manner.

The trough elements 42 and 84 and the intermediate cable guides 38 are preferably made of plastic material of sufficient strength and thickness to provide strong and reliable support for the several feeder cables and/or optical fiber cables which they must support.

Figure 11:
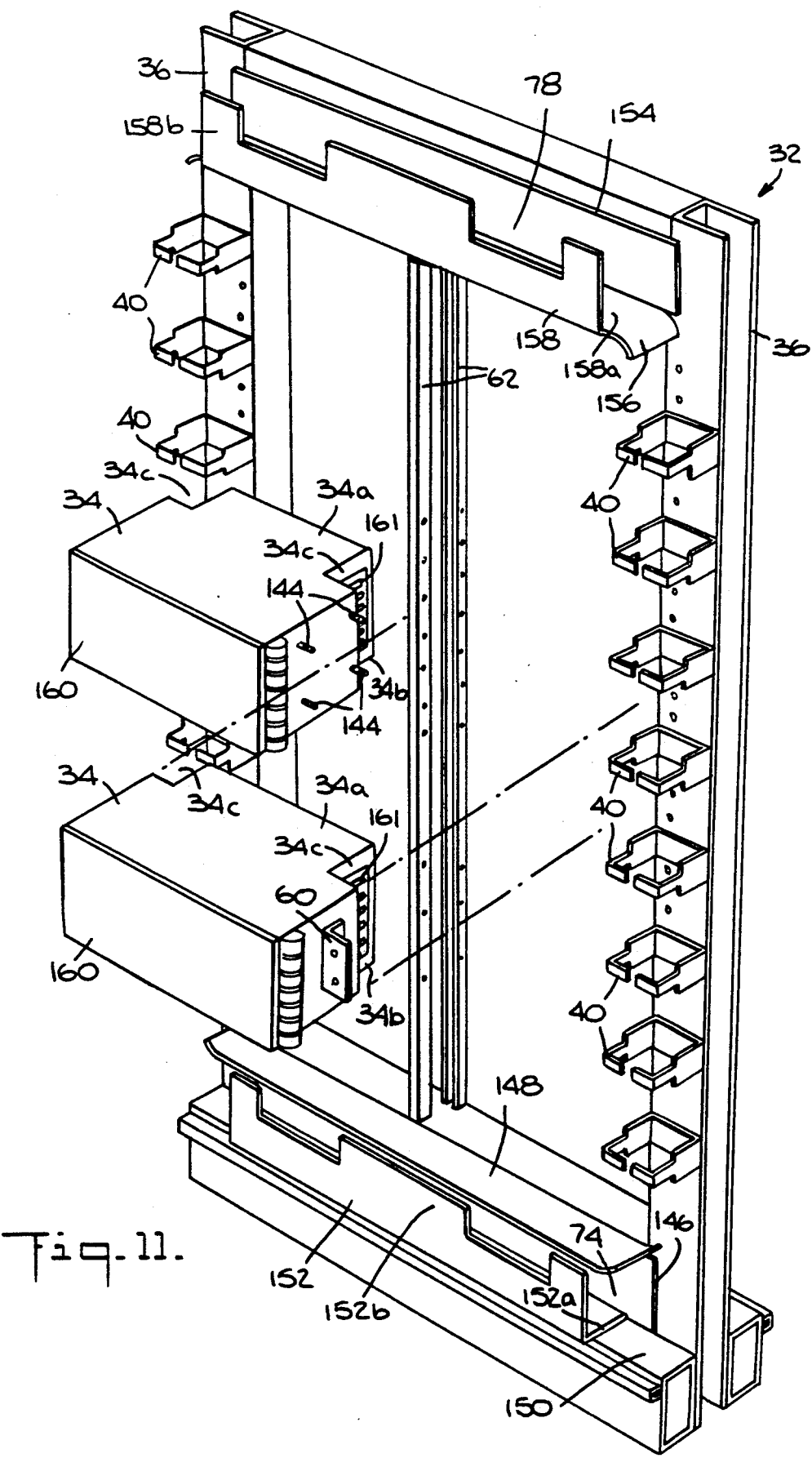
FIG. 11 is an exploded perspective view of housing and support arrangement used in an optical fiber distribution frame system according to the present invention.

The basic construction of the distribution frame system 32 is best seen in FIG. 11. As there shown, the lower ends of the vertically extending frame members 36 are welded on opposite sides thereof to the ends of horizontally extending base members 138. The upper ends of the frame members 36 are welded on one side to the ends of a plate 140 and on the other side they are welded to the inner clamp support panel 80. The intermediate vertical frame members 62 are welded at their lower ends to a horizontal plate 142 extending between the frame members 36 and they are welded at their upper ends to a similar plate (not shown). The housings 34, which are of generally rectangular box-like outer configuration, fit into the spaces between the intermediate vertical frame members 62 and the main frame members 36.

The sides of the housings 34 which face the vertically extending frame members 36 are bolted to the frame members via the angle brackets 60. The opposite sides of the housings 34, which face the intermediate vertical frame members 62, are directly bolted to those members by means of bolts 144 which project through the sides of the housing. As can be seen, the vertical cable guides 40 are bolted directly to the vertically extending frame members 36 at locations between adjacent stacked housings 34.

The front lower horizontal trough 74 is formed of a flat inner plate 146 and upper and lower horizontal plates 148 and 150, which extend out from the top and bottom edges of the plate 146. The plate 146 in turn is welded to the lower portion of the vertically extending frame members 36. An angle plate 152 has a flange portion 152a which rests on the lower horizontal plate 150 and a vertical portion 152b which extends parallel to and spaced from the inner plate 146. The flange portion 152a is formed with slots (not shown) which accommodate fastening bolts and allow the plate 152 to be bolted to the frame at various spacings between the vertical portion 152b and the inner plate 146. This permits adjustment to accommodate changes in the number of optical fiber cables that may be used in the distribution frame system.

The upper horizontal trough 78 is of similar construction to the lower horizontal trough 74. The upper horizontal trough 78 comprises an inner plate 154, a horizontal plate 156 which extends out from the lower edge of the plate 154 and an angle plate 158. The angle plate has a flange portion 158a bolted to the horizontal plate 156 and a vertical portion 158b which is parallel to and spaced from the inner plate 154. The mounting of the angle plate 158 is similar to that of the angle plate 152 of the lower trough 74 and this permits the size of the upper trough also to be adjusted.

As can be seen in FIG. 11, the housings 34 have a box-like outer configuration and are molded from plastic as upper and lower halves 34a and 34b which are bolted together. The housings 34 are open at the front; and hinged covers 160 are provided to cover the front openings.

It will be noted from FIG. 11 that the rear corners of the housings 34 are indented at 34c; and rectangular openings 161 are provided in the indented portions of the housing side walls to permit entry into the housing of optical fiber cables 662 from the vertical cable guides 40.

Figure 12:
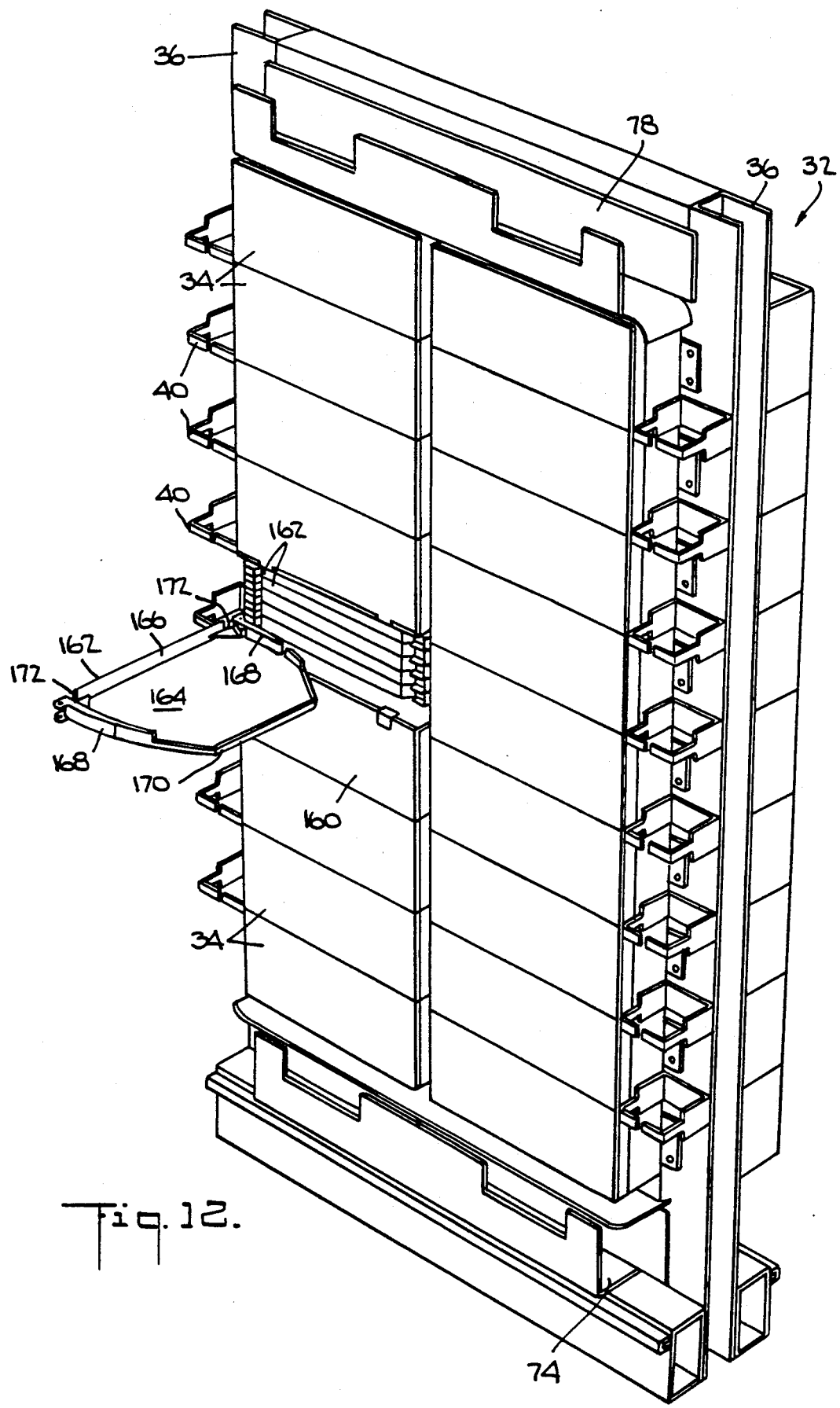
FIG. 12 is a view similar to FIG. 11 but showing the assembly of the housing and support arrangement.

FIG. 12 shows the front of the distribution frame system 32 with all of the housings 34 in place. One of the housings 34 is shown with its cover 160 swung down to the open position to expose the front edges of a stack of shelves 162. The shelves 162 are each mounted to the housing 34 by means of an associated pivot 163 to swing around a common vertical axis near one side of the front opening of the housing 34. The shelves 162 may be pivoted from an enclosed position, where they are fully contained within the housing to an access position where they are substantially fully outside the housing. One of the shelves 162a is shown in its access position.

The shelves 162 are all of the same configuration. Each shelf is preferably molded from plastic and has an expansive bottom wall 164 and front and side walls 166 and 168 which extend upwardly a short distance from the front and side edges, respectively, of the bottom wall. The bottom wall 164 is in the shape of a truncated semi-circle. At its front edge, the bottom wall extends substantially the width of the housing 34; and then it tapers rearwardly in a curved manner to a straight back edge 170 which is located near the back of the housing 34 when the shelf is in its closed position. This configuration provides maximum space on the shelf and at the same time allows clearance for the shelf to swing out of the housing. Also, since both sides of the shelf curve inwardly, the shelf can be mounted to pivot from either side of the housing 34.

The side walls 168 of the shelf 162 extend only part way back from the front wall 166. This allows clearance in the back region of the shelf for those optical fiber cables 662 which enter and exit the shelf from the rear of the housing. Also, clearances 172 are provided between the front wall 166 and the side walls 168 to permit entry and exit of optical fiber cables 662 from the vertical cable guides 40.

The shelf 162 is shown in FIG. 12 with no internal structure. In use, depending on the particular function the shelf is to serve, either optical fiber cable storage, optical fiber connector mounting or optical fiber cable splice mounting, appropriate structures, to be described hereinafter, are snapped or fitted into place.

FIGS. 13-16 show further details of the housing and shelf construction; and they also show internal structures which permit a shelf to function for both optical fiber cable storage and optical fiber connector mounting.

Figure 13:
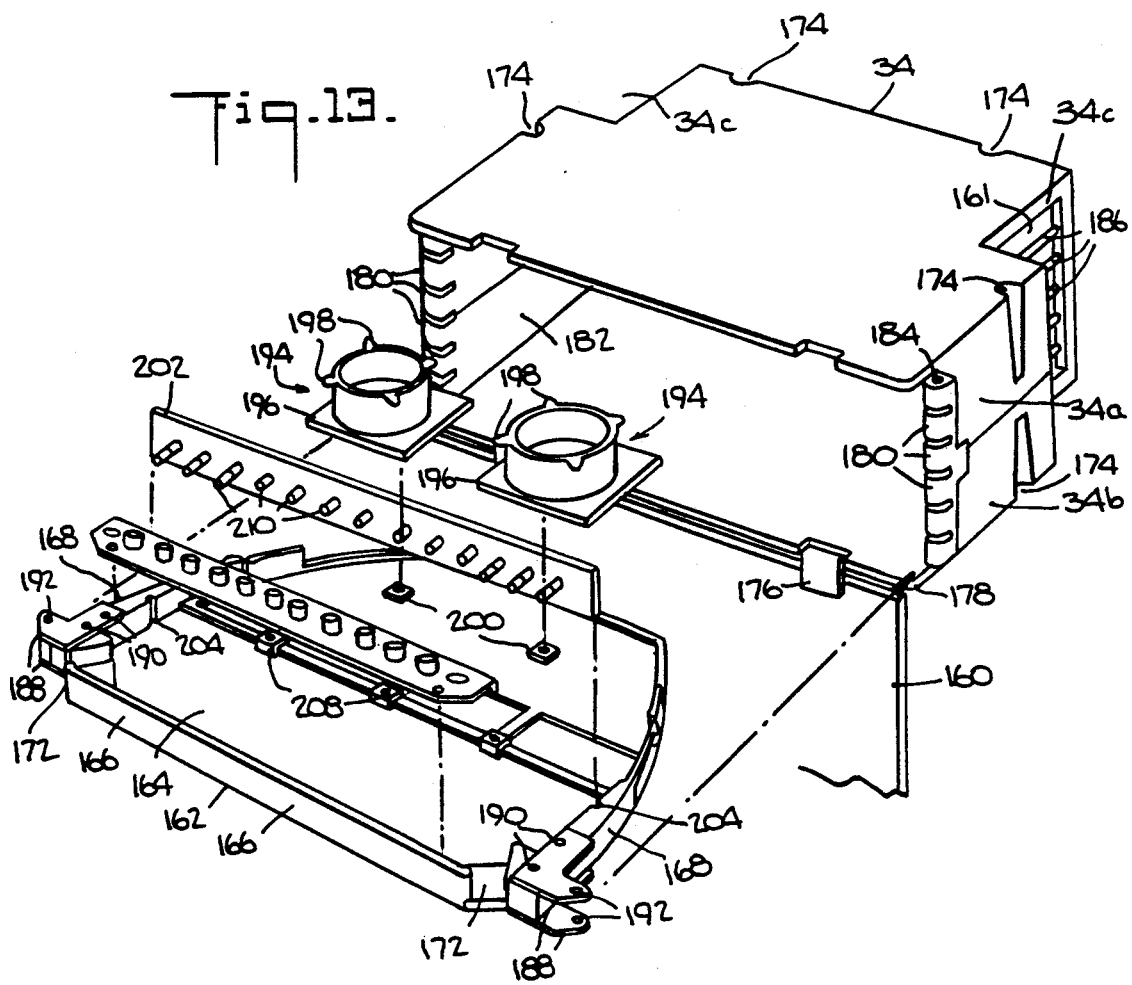
FIG. 13 is an exploded perspective view of a housing and shelf assembly which can be used in the optical fiber distribution frame system of FIG. 1 and members for adapting the shelf to use as a connector shelf.

As can be seen in FIG. 13, the upper and lower housing halves 34a and 34b are mutually symmetrical. Indentations 174 are provided along the side and back walls of each housing half to form shoulders through which bolts may pass to secure the housing halves together. Hinges 176 are provided along the front edge of a lower wall 178 of the housing to mount the cover 160. Pivot support projections 180 are formed along the front edges of sidewalls 182 of the housing 34. These projections are closely spaced in the vertical direction. A common pivot rod opening 184 is formed through the projections 180 on each side of the housing.

A plurality of horizontal guide rods 186 extend across the rectangular openings 161 near the rear of the housing 34. These guide rods are spaced apart to support incoming and outgoing optical fiber cables 662 at different vertical levels according to the level of the particular shelf 162 to or from which particular cables extend. The guide rods 186 are preferably plastic dowels mounted at their ends so that they rotate freely. This minimizes the possibility of kinking the optical fiber cables 662 when the shelves are swung open and closed.

The front ends of the shelf side walls 168 are relatively thick and they provide support for upper and lower pivot flanges 188 which are held in place by rivets 190. The pivot flanges extend laterally beyond the shelf and fit into the spaces between the projections 180 on the housing. The flanges have holes 192 which, when fitted into the spaces between adjacent projections, align with the common pivot rod openings 184. A pivot rod (not shown) extends down through the projection openings 184 and the flange holes 192 to complete the construction of the pivot 163 and hold the front corner of the shelf for pivotal movement into and out from the housing. Because the shelves and housing are of symmetrical configuration, the shelves may be pivotally connected to the housing at either front corner thereof to swing out either in a left hand direction or in a right hand direction.

Figure 14:
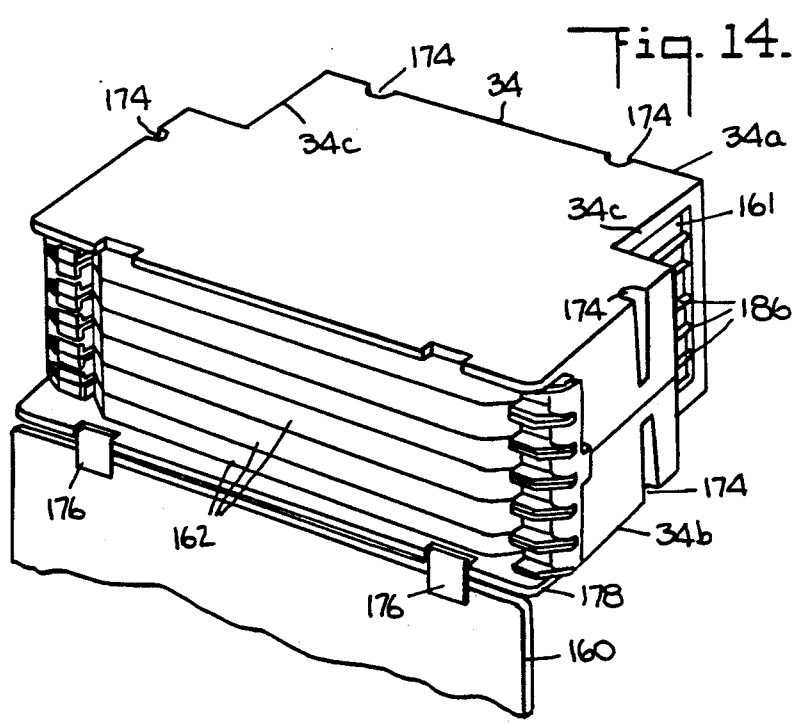
FIG. 14 is a view similar to FIG. 13 but showing the shelf in its enclosed position within the housing.

As shown in FIG. 14, six of the shelves 162 fit in the housing 34; and, when all the shelves are pivoted to their closed position as shown, the cover 160 may be swung up to a closed position. Suitable means (not shown) may be provided to hold the cover 160 in its closed position.

Figure 15:
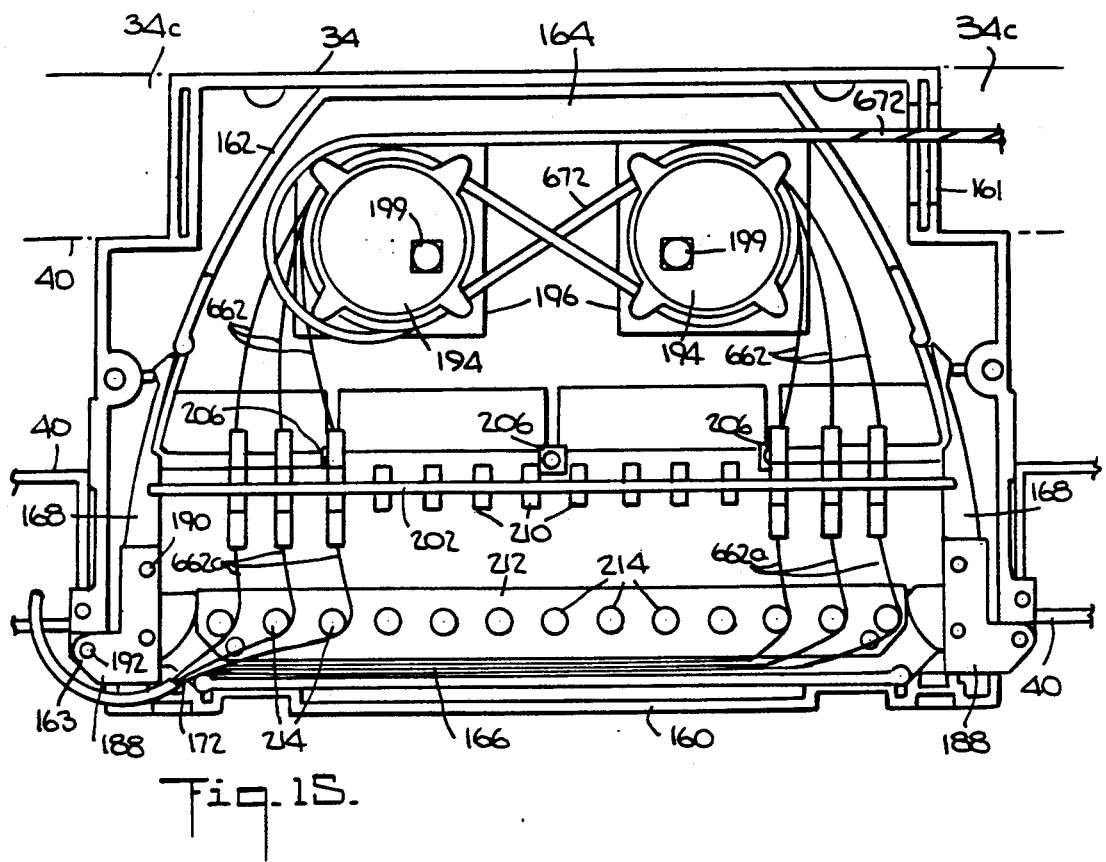
FIG. 15 is a plan view of the housing and shelf shown in FIG. 13 with an optical fiber cable arranged therein.
Figure 16:
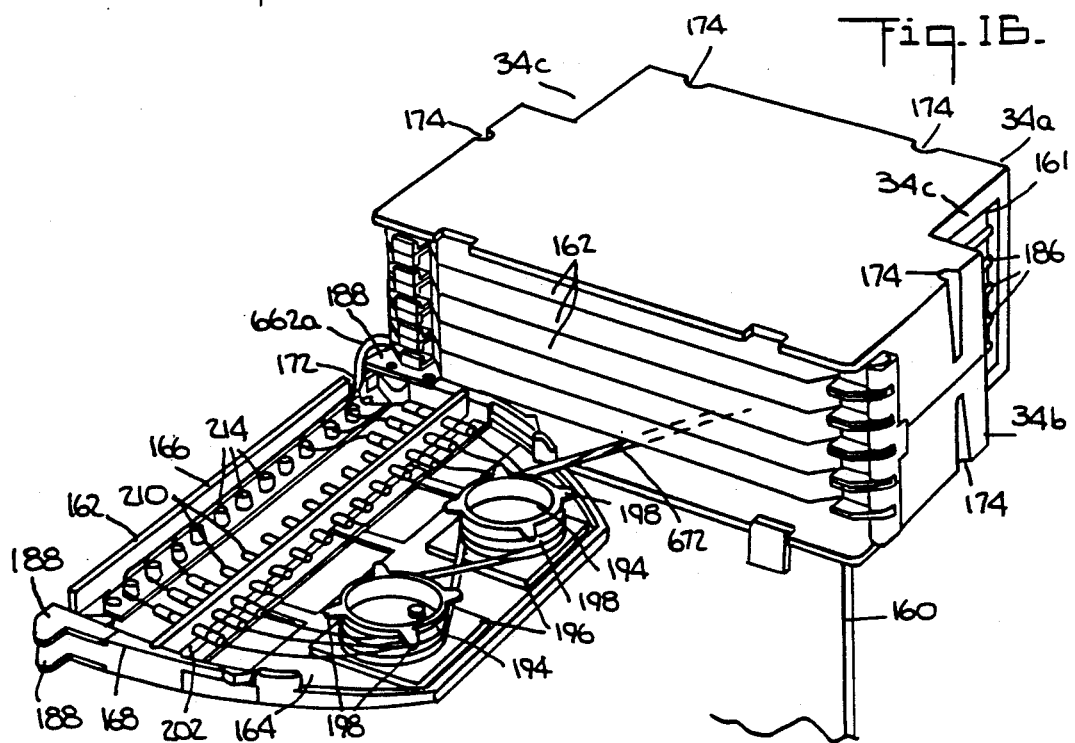
FIG. 16 is a perspective view of the housing and shelf of FIG. 15 showing the shelf fully pivoted to its access position.

The shelf arrangement shown in FIGS. 13, 15 and 16 is adapted to hold optical fiber cable storage spools 194 of generally cylindrical shape. These spools extend up from square base plates 196 and they have tabs 198 which project out from their upper edges. Each spool with its associated base plate and tabs is preferably made of plastic and is molded as one piece. Each base plate 196 is formed with a conventional snap fastener 199 which engages and snaps into place in an associated hole 200 in the bottom wall of the shelf 162. When the spools 194 are snapped in place, optical fiber cables 662 may be wound around the spools as shown in FIG. 15 for storage purposes. It will be appreciated that the spools 194 may be removed from the shelf simply by releasing their fasteners.

The specific construction of the snap fastener 199 is not novel. Any of several well known snap fastener constructions may be used. However the snap fastener arrangement shown in FIG. 27 is especially well suited for the present invention. As shown in FIG. 27 the shelf bottom wall 164 is formed on its upper surface with a rectangular boss 164a which fits into a recess 196a formed in the lower surface of the spool base plate 196. This locates the spool 194 and holds it against both translational and rotational movement as long as it is snap fastened to the shelf.

The hole 200 in the shelf bottom wall 164 is located centrally of the boss 164a and a corresponding hole 196b is located centrally of the spool recess 196a. The fastener 199 has an outer locking portion 199a and an inner actuator portion 199b. The outer locking portion 199a extends through the hole 196b in the spool base portion and is held therein by a lower shoulder 199c and an upper flange 199d. The lower region of the outer locking portion 199a has spreadable locking legs 199e which project through the tray bottom wall hole 200 and, when spread as shown in FIG. 27, expand beyond the diameter of the hole 200 and are prevented from pulling out of the hole. The inner actuator portion 199b of the fastener extends down through the center thereof and has a cam shaped lower end portion 199f which when pushed down as shown in FIG. 27, cams the legs 199e outwardly into locking position. To release the spool 194 from the shelf 162, the actuator portion 199b of the snap fastener is pulled up so that its cam shaped lower end portion 199f allows the locking portion legs 199 to retract so that they can be pulled out of the hole 200 in the shelf.

Referring again to FIG. 13, the shelf 162 is also provided with an elongated flange-like connector sleeve support panel 202 which extends across the shelf 162 parallel to and spaced from the front wall 166. The ends of the panel 202 slip into vertical slots 204 which open at the tops of the sidewalls 168 of the shelf. Also, as shown in FIG. 15, the panel 202 has rearwardly extending tabs 206 spaced apart along its lower edge; and these tabs also have a conventional snap fastener which snaps into an associated hole 208 formed in the shelf bottom wall 164. By releasing the fasteners and pulling up the panel 202, it may be easily removed from the shelf.

The panel 202 supports optical connector sleeves 210 which are spaced apart along its length. The precise internal shape of the sleeves depends upon the particular type of optical fiber connectors which they are to couple together. The outer shape of the sleeves 210 is cylindrical and the sleeves are all of the same outer size and configuration so that sleeves for different types of optical fiber connectors can be used in the same panel.

A guide bar 212 is snapped onto the bottom wall 164 of the shelf between the front wall 166 and the panel 202. The fastening arrangement for the guide bar 212 is the same as for the spools and the connector sleeve support panel 202; and therefore the guide bar may easily be removed from the shelf. The guide bar 212 is formed with spaced apart upwardly projecting abutments 214 which serve to guide optical fiber cables from the support panel 202 so that they bend gently along a path leading to one of the clearances 172 between the front and side walls of the shelf.

As shown in FIG. 15, one subgroup of optical fiber cables 662 from the vertical cable guides 40 on the rear side of the distribution frame system 32 enters the housing 34 via the associated rear housing opening 161. The cable subgroup 672 is held together by the spiral plastic wrap 674. The cable subgroup 672 extends from the opening 161 at the rear of the housing to the farthest storage spool 194a on the shelf 162 and winds around the spool. The cable subgroup is then wound in figure eight fashion around both spools until essentially all of its length is used up; and then individual optical fiber cables 662 are separated from the subgroup 672 and are extended toward associated ones of the connector sleeves 40. The ends of the optical fiber cables 662 are provided with optical connectors 220 which can be plugged into the sleeves 210 on the side thereof facing the spools 194. Output optical fiber cables 662a, which may for example, be jumper cables, have corresponding connectors 224 on their ends which are plugged into the opposite sides of the sleeves 210.

The output optical fiber cables 662a are guided around the abutments 214 and from there out through the clearance 174 on the side of the shelf 162 where it is pivotally connected to the housing 34. From there the output optical fiber cables pass out of the front of the housing to the vertical cable guides 40 along the front portion of the distribution frame assembly 32.

It will be noted that in the shelf arrangement of FIGS. 15 and 16, optical fiber cables 662 enter the housing 34 from the rear of the housing at a location diagonally opposite the location where the shelf 162 is pivoted to the housing; and other optical fiber cables 662a exit the housing near the location where the shelf is pivoted to the housing. Since the linear movement of the shelf is minimal at the pivot, the optical fiber cables 662a, which pass near the pivot, are subject to only minimal movement when the shelf is pivoted. However, the amount of linear shelf movement is maximum at a location diagonally opposite the pivot and, since this is where the optical fiber cables 662 enter the housing and shelf, they are subjected to maximum movement as the shelf pivots. With the arrangements of the present invention, however, this movement is accommodated by maintaining cable support at all times so that the cable is not allowed to move freely and become subject to uncontrolled bending.

As can be seen in FIG. 16, as the shelf 162 pivots to open position, the incoming optical fiber cable subgroup 672 unwraps from the back region of the two storage spools 194; and then, as the shelf is pivoted back into the housing, the turning movement of the shelf causes the cable subgroup 672 to rewrap around the storage spools. At all points of this pivoting movement the portion of the cable subgroup 672 between the housing inlet opening 161 and the shelf storage spools 194 is maintained as a straight run and therefore the cable is not permitted to bend. This control of the optical fiber cable is achieved by maintaining an abutment, i.e. the spools 194, at a location on the shelf 162 farther away from the front of the shelf at the front opening of the housing than a line which extends between the shelf pivot and the housing inlet opening 161. This permits the pivotal shelf movement to cause winding and unwinding of the optical fiber cable 662 on the storage spools 194.

Figure 17:
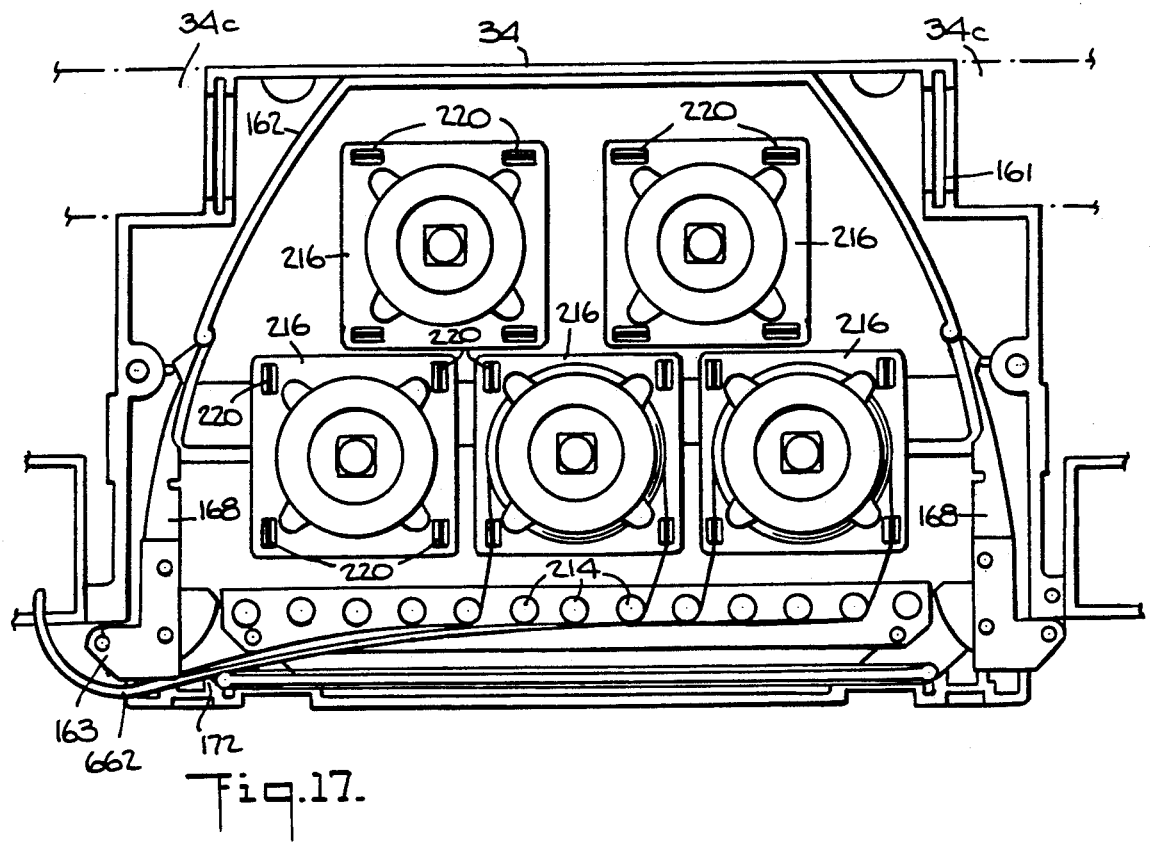
FIG. 17 is a view similar to FIG. 15 but showing the shelf arranged with elements for adapting the shelf to use as an optical fiber cable storage shelf.
Figure 18:
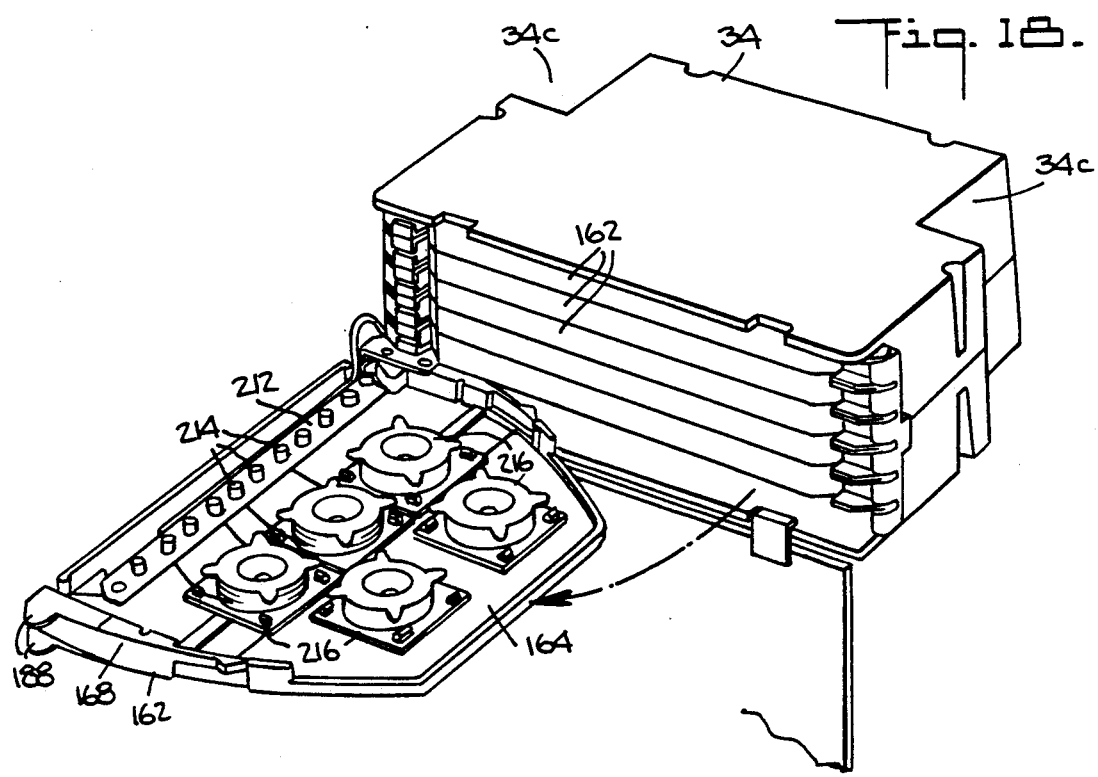
FIG. 18 is a view similar to FIG. 16 but showing the shelf as arranged with elements for adapting the shelf to use as an optical fiber cable storage shelf.

FIGS. 17 and 18 show a shelf adapted for storage of optical fiber cables 662. As shown in FIG. 17, there are provided five storage spools 216 of essentially the same construction as the storage spools 194 in FIGS. 13, 15, and 16. These storage spools are snapped into openings provided therefore in the bottom wall 164 of the shelf 162 as in the case of the spool 194. The spools 216 however have base plates 218 with sets of resilient clamping fingers 220 molded thereon at each corner. One set of clamping fingers holds an optical fiber cable 662 where it approaches the spool. A portion of the optical fiber cable 662 beyond the clamping fingers is then coiled around the spool 216 and another set of the clamping fingers 220 holds the optical fiber cable 662 where it leaves the spool. The clamping fingers maintain the optical fiber cable closely coiled around the spool 216 so that it is supported to bend at a curvature set by the spool diameter and is not free to become more sharply bent.

The storage shelf of FIGS. 17 and 18 also includes the guide bars 212 and abutments 214 described above in connection with the connector support shelf of FIGS. 13, 15 and 16. As in the connector support shelf, the abutments 214 in the storage shelf of FIGS. 17 and 18 serve to guide the optical fiber cable 662 from the clearance 172 on the side of the shelf that is pivoted to the housing. In the case of the storage shelf however, the optical fiber cables 662 all pass through the clearance 172 to and from the vertical cable guides 40 on the front of the distribution frame system.

It will be appreciated that from one to five storage spools 216 may be mounted in a single shelf 162 depending on the number of optical fiber cables 662 to be stored. Actually two separate optical fiber cables may be stored on each spool 216 and each cable will have its spool entering portion and its spool exiting portion clamped by a different one of the four sets of clamping fingers 220 on the spool base plate 218. Thus one shelf 162 has a capacity to store ten different optical fiber cables. If a particular optical fiber cable is so long that it cannot be accommodated on a single spool, its excess length may be taken up on an adjacent spool.

Figure 19:
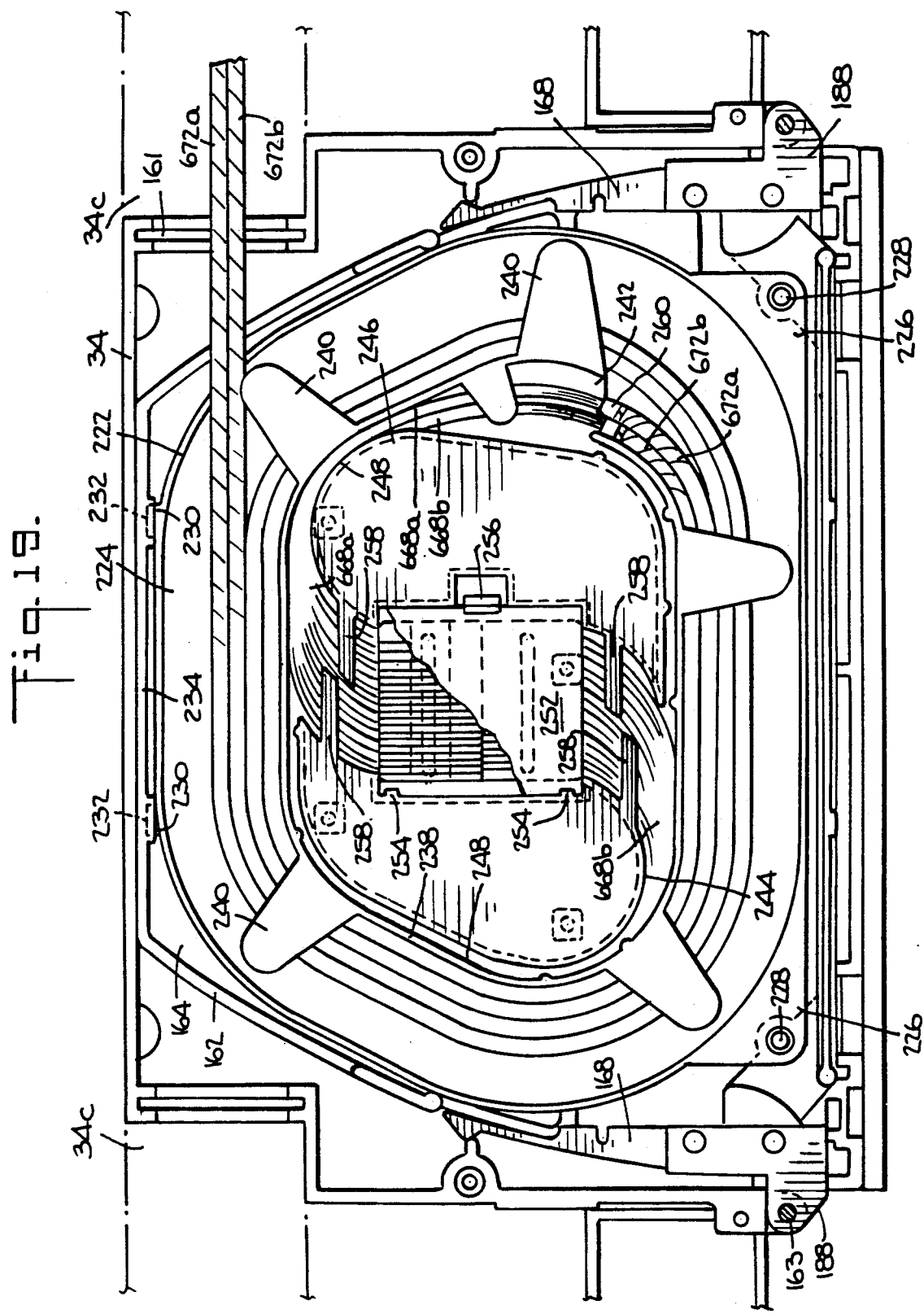
FIG. 19 is a view similar to FIG. 15 but showing the shelf as arranged with elements for adapting the shelf for use as an optical fiber cable splice support.
Figure 20:
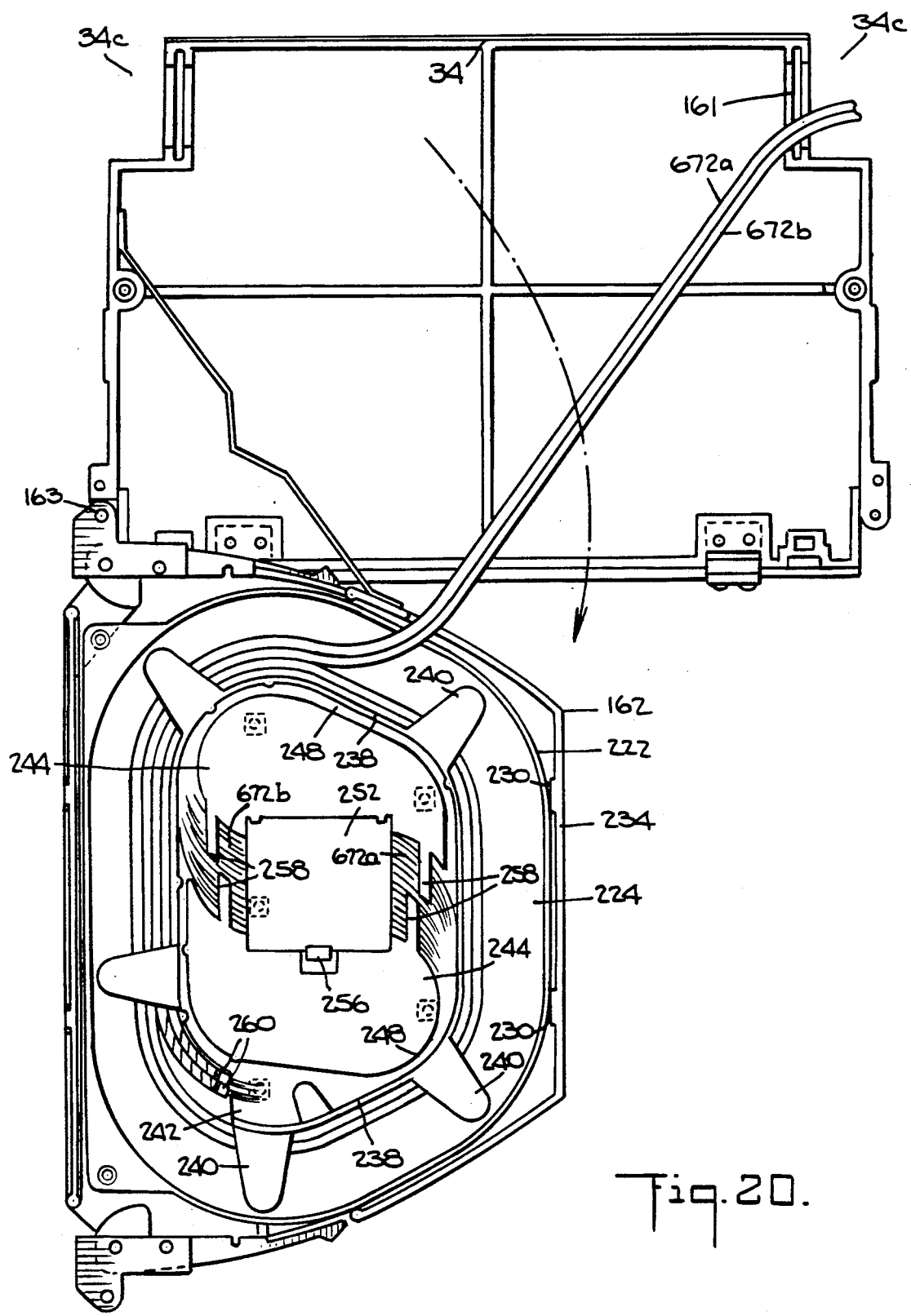
FIG. 20 is a view similar to FIG. 19 but showing the shelf swung out to its access position.
Figure 21:
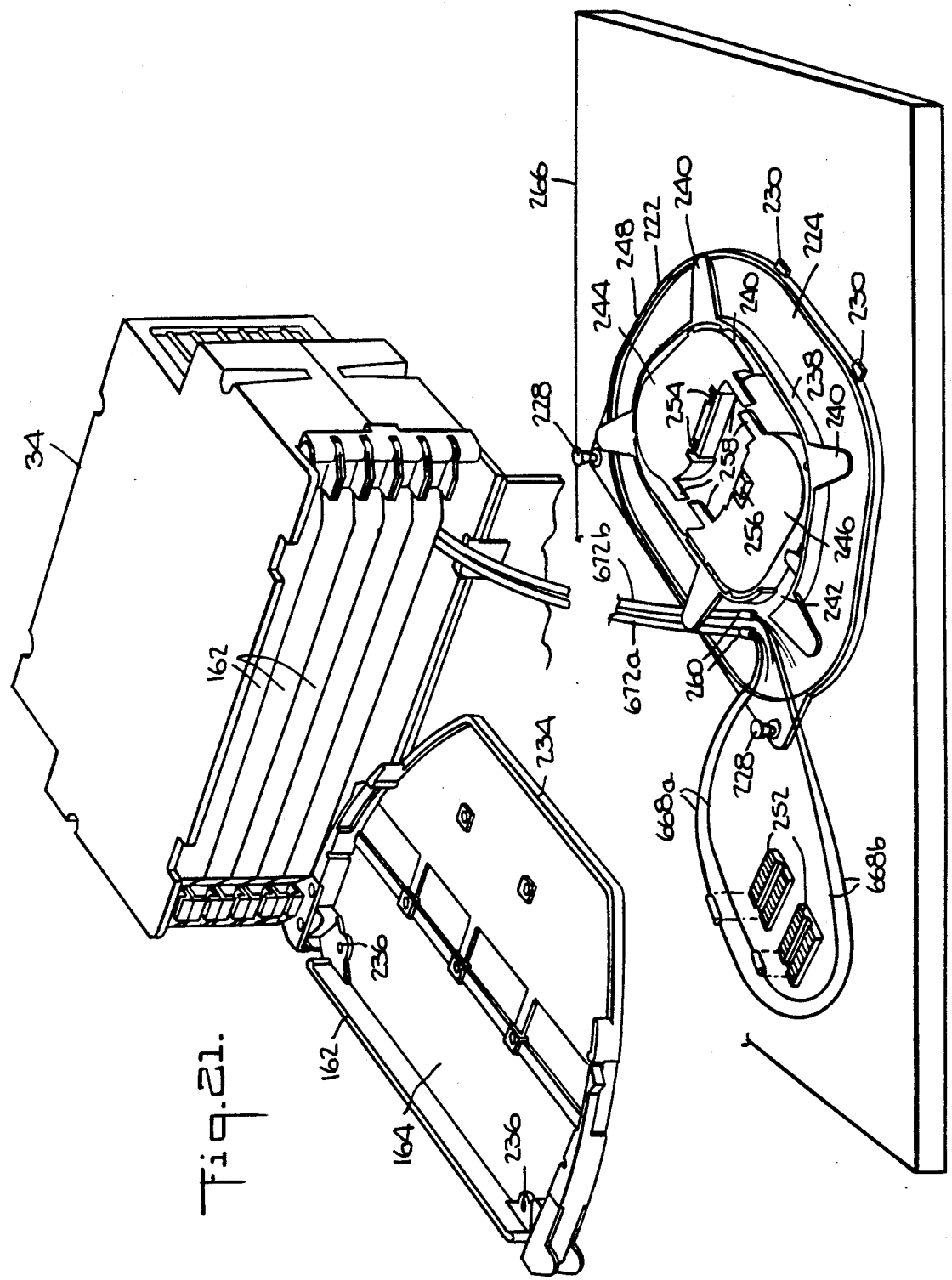
FIG. 21 is a perspective view similar to FIG. 16 but showing the shelf arranged with elements for adapting the shelf for use as an optical fiber cable splice support shelf and further showing the manner in which a cable splice support is removed from the shelf for making cable splice modifications.

FIGS. 19-21 show a shelf 162 adapted to hold optical fiber cable splices. As shown in these drawings, a cable and splice holder tray 222, which is made of molded plastic, is arranged to be removably mounted in one of the shelves 162. The holder tray 222 has a flat expansive bottom wall 224 with corner flanges 226 at its front corners and snap fasteners 228 on each of these flanges. A pair of mounting tabs 230 extend out from the rear edge of the bottom wall 224.

The tray 222 is mounted on the shelf 162 by inserting the tabs 230 into slots 232 formed in a ledge 234 along the rear edge of the shelf. When the tray 222 is thus positioned on the shelf, its fasteners 228 are in alignment with tray mounting holes 236 (FIG. 21) near the front of the shelf bottom wall 164. The fasteners need only to be pushed down into the holes 236 to secure the tray to the shelf. The tray 222 may easily be removed by pulling up on the fasteners 228 and pulling the tray forwardly to bring the tabs 230 out of the shelf slots 232.

The tray 222 has a circumferential wall 238 which extends up from the bottom wall 224 at some distance inwardly from its outer edge; and flange elements 240 extend outwardly from the upper edge of the wall 238. The circumferential wall 238 serves as a winding spool for accommodating a length of the optical fiber cables 662 while they are held together in a subgroup 672; and the flange elements 240 cooperate with the circumferential wall 238 and the bottom wall 224 to maintain the cable subgroups in position when they are wound around the circumferential wall 238. The circumferential wall also has an opening 242 which leads to an internal region surrounded by the inner surface of the wall.

Within the region surrounded by the wall 238 are two spaced apart raised formations 244 and 246. These raised formations are shaped and positioned to extend close to the inner surface of the wall 238 to define a channel 248 along the inside of the wall. As will be seen, this channel serves to guide optical fiber buffer cables 668 which extend from the optical fiber cables 662 on the shelf. The raised formations 244 and 246 are also shaped to define a rectangular recess 250 between them. This recess holds an optical fiber splice holder 252; and the recess is open at its opposite ends to the channel 248 so that the optical fiber buffer cables 668 in the channel can extend to splices on the splice holder 252. The raised formation 244 has a pair of upper retaining tabs 254 extending into the recess 250 over one upper edge of the splice holder. The raised formation 246 has a retractable latch 256 which also extends into the recess and over the opposite upper edge of the splice holder. The retaining tabs and latch cooperate to hold the splice holder 252 securely in place in the recess 250 and yet the splice holder can easily be removed simply by pulling back on the latch 256 and pulling the splice holder out from under the tabs 254.

Sets of retaining fingers 258 extend out from the raised formations 244 and 246 between the channel 248 and the recess to hold the optical fiber buffer cables 668 in place. These retaining fingers are spaced from each other to permit the optical fiber buffer cables to be removed when the splice holder is released.

Optical fiber cable clamps 260 are mounted on the bottom wall 224 of the plate 222 adjacent the opening 242 in the circumferential wall 238.

As can be seen in FIG. 19, two subgroups 672a and 672b of optical fiber cables 662 enter the housing 34 via the rectangular opening 161 which is diagonally opposite the shelf pivot 163. These subgroups of optical fiber cables are together wound several times around the circumferential wall 238 between the bottom wall 224 and the flange elements 240. It will be noted that the circumferential wall 238 forms an abutment in the shelf 162 which is further removed from the open front of the housing 34 than a line which extends from the shelf pivot 163 to the rectangular opening 161 in the housing 34 through which the cable subgroups 672a and 672b enter. Also, when the shelf 162 is in its enclosed position, as shown in FIG. 19, the optical fiber cable subgroups extend directly from the opening 161 to the side of the circumferential wall 238 which is furthest from the open front of the housing 34. While the shelf 162 is being pivoted from its enclosed position, as shown in FIG. 19, to its access position, as shown in FIG. 20, the movement of the wall 238 is such that the cable subgroups 672a and 672b begin to unwind automatically and remain essentially straight between the wall 238 and the housing opening 161 as the shelf 162 swings open to its access position. Accordingly, the subgroups 672a and 672b of optical fiber cables 662 are held in a straight line and are not allowed to hand freely in a manner that would permit them to become bent or kinked.

After the shelf 162 is swung open, as shown in FIG. 20, the splice holder tray 222 is then removed from the shelf by pulling up on the snap fasteners 228 to release the front of the tray and then pulling the tray forwardly to bring the tabs 230 out of the slots 232 in the shelf. The tray 222 may then be manipulated by turning it to unwind the remainder of the optical fiber cable subgroups 672a and 672b from around the circumferential wall 238.

The ends of the optical fiber cable subgroups 672a and 672b are clamped by the clamps 260 near the opening 242 in the circumferential wall 238. Thus when the cable subgroups 672a and 672b are fully unwound from the circumferential wall 238, as shown in FIG. 21, they are still secured to the plate; however the tray 222 now extends a substantial distance from the housing 34 and can be set on a separate table 266 so that the splices which are contained by the tray can be worked on in a stable environment away from the housing.

As shown in FIGS. 19 and 20, subgroups 668a and 668b of the optical fiber buffer cables 668 extend respectively from the ends of the optical fiber cable subgroups 672a and 672b where they are clamped to the tray 222 by means of the clamps 260. These buffer cable subgroups pass through the opening 242 in the circumferential wall 238 and into the channel 248 formed between the inner surface of the wall 238 and the raised formations 244 and 246 in the region surrounded by the wall. The subgroups 668a and 668b of optical fiber buffer cables inside the circumferential wall 238 are wound around the raised formations 244 and 246. One of the buffer cable subgroups 668a then enters between the formations 44 and 246 on one side of the splice holder 252 while the other subgroup 668b enters between the formations 244 and 246 on the other side of the splice holder. Thus the two buffer cable subgroups are connected to each other via optical fiber splices 268 in the splice holder 252.

As shown in FIG. 21, after the tray 222 has been removed from the shelf 162 and set on the table 266, the splice holder 252 is removed from the tray and the optical fiber buffer cable subgroups 668a and 668b are uncoiled from the channel 248 around the raised formations 244 and 246 so that the splices 264 on the splice holder 252 can be worked on away from the tray 22. It will be noted that the buffer cable subgroups 668a and 668b, which are especially fragile and susceptible to undue bending, are held securely in the tray 222 while the shelf 162 is opened and while the tray 222 is removed and separated from the shelf. The buffer cable subgroups 668a and 668b are not handled until after the tray 222 is positioned firmly on the table 266.

The splice holder 252 comprises a base portion 252a and a flat cover 252b. Actually, the base portion 252a, for ease of manufacture, can be made in two pieces, as shown in FIG. 21. The base portion 252a, as shown in FIGS. 22 and 23, comprises a block of plastic formed with parallel fiber and splice recesses 270 and 272 arranged alternately to each other and splice channels 274 and 276 arranged to cross the fiber and splice recesses. The fiber recesses 270 are narrow and each can accommodate a fiber optic buffer cable from one of the subsets 262a or 264a. The splice recesses 272 on the other hand, are wider and can accommodate an optical fiber splice 268.

As can be seen in FIG. 22, the fiber recesses 270 are aligned with each other across each of the splice channels 274 and 276 and the splice recesses 272 are aligned with each other across each of the splice channels 274 and 276. However, the fiber recesses 270 associated with one of the splice channels 274 are aligned with splice recesses 272 associated with the other splice channel 276. With this arrangement, it is possible to accommodate a large number of splices 268 in a relatively narrow space by longitudinally displacing alternate splices with respect to the other splices.

It will also be seen in FIGS. 22 and 23 that holes 278 are formed in the base portion 252a of the splice holder. These holes extend from the bottom of the base portion up into the splice channels 274 and 276 in alignment with the splice recesses 272 associated with those channels. The holder 278 accommodates a pin which can be pushed through and into contact with the overlying splice 268 and can push the splice out of its respective recess 272 without imposing any longitudinal strain on the optical fibers associated with the splice being removed from the holder.

Reverting to FIG. 21, it will be appreciated that the splices 268 can be worked on and replaced outside of the splice holder 252. The subgroups 668a and 668b of optical fiber buffer cables 668 then can be rewound in the channel 248 formed in the tray 222 and the splice holder replaced on the tray. The tray then can be turned to rewind the optical fiber cables subgroups 672a and 672b around the circumferential wall 238 and the tray can then be replaced on the shelf 162. The shelf is then pivoted back to its enclosed position as shown in FIG. 19.

Figure 24:
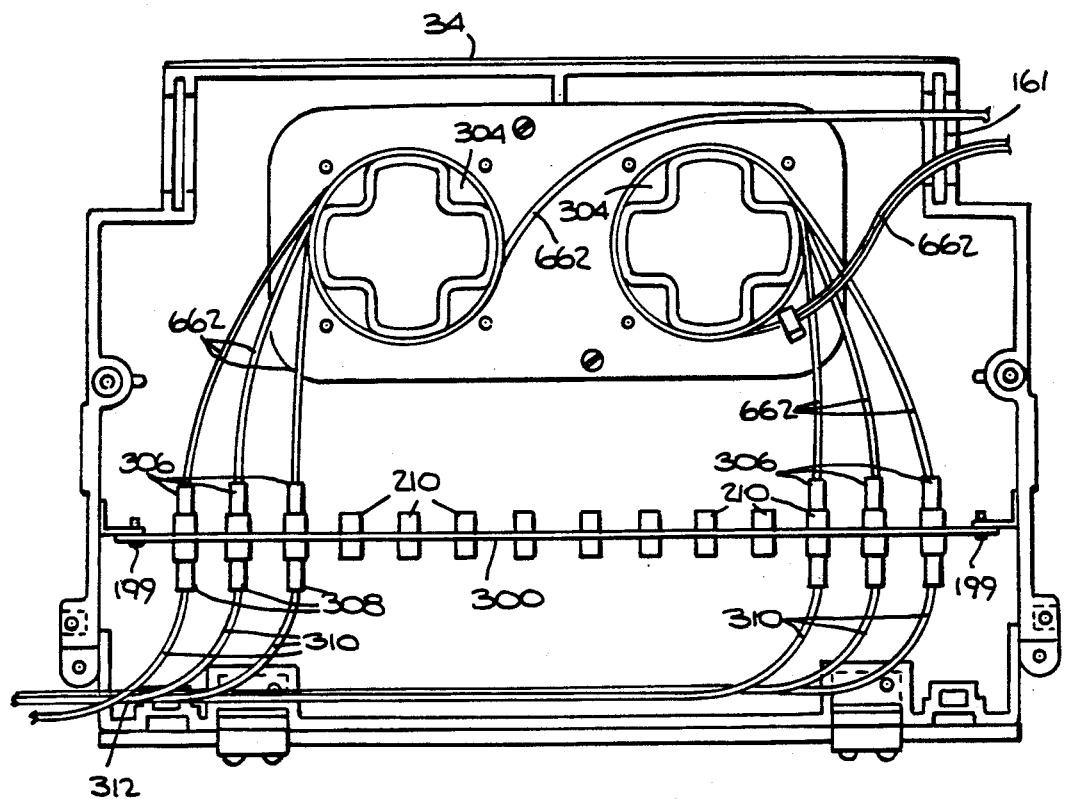
FIG. 24 is a plan view of the interior of a housing arranged with an optical fiber cable storage and connector arrangement which does not use a pivoted shelf.
Figure 25:
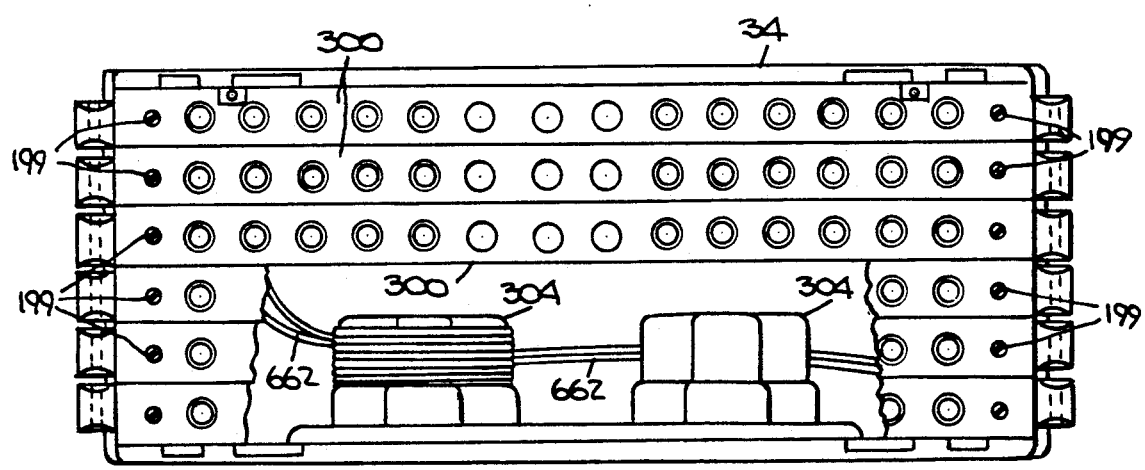
FIG. 25 is a front elevational view of the housing of FIG. 24.

FIGS. 24 and 25 show an alternate arrangement for mounting cable connectors in one of the cable housings 34. This alternate arrangement dispenses with pivotal shelves for supporting the connectors and instead uses panels 300 which extend across the housing 34 at different levels and which are attached at each end by means of snap fasteners 199 to brackets 302 fixed to the opposite sidewalls of the housing. Each panel 300 occupies the same level in the housing as one of the trays 162 in the preceding embodiment and each panel supports a similar number of connector sleeves 210 to which optical connectors 220 are connected.

Optical fiber cables 662, which extend into the housing 34 via the rectangular opening 161 in the rear thereof, are wound around spools 304 which are mounted on the housing floor. The spools 304 are generally of the same construction as the spools 216 in the preceding embodiment but are higher to accommodate a larger number of fiber optic cables. The cables 662 each have an associated optical connector 306 at the end thereof which is plugged into an associated connector sleeve 210 at the back of one of the panels 300. Corresponding optical connectors 308 are plugged into the sleeves 210 at the front of the panels 300 and optical fiber cables 310 extending from these connectors exit the housing 34 through an opening 312.

Should it be necessary to gain access to the connectors 306 or optical fiber cables 662 behind the panels 300 any panel may be removed individually by pulling out its associated fastener 199.

FIG. 28 shows a typical optical fiber cable circuit which may be used in the distribution frame system of the present invention. As shown, an input optical fiber cable 662 from outside plant equipment extends down from the horizontal racking system 30 and the vertical cable guides 40 and enters a shelf 162a which is adapted for splicing. The optical fiber in the cable 662 is spliced in the splice holder 252 to a pigtail cable 662a which exits the shelf at the same location, i.e., at the rear thereof where the cable 662 entered. The pigtail cable 662b then extends down to the rear portion of a shelf 162b which is adapted to support optical connector sleeves 210. If the shelf 162b is in the same housing as the shelf 162a containing the splice holder 252, the pigtail cable 662b need not reenter the vertical cable guide but may simply extend directly to the shelf which is adapted to support optical connector sleeves. The pigtail cable 662b is then connected, via the connector sleeves to a jumper cable 662c which exits the shelf 162b at the front thereof and on the opposite side from the pigtail cable 662b. The jumper cable 662c then extends to a shelf 162c which is adapted, by means of storage spools 216, for optical fiber cable storage. Excess length of the jumper cable 162c is taken up on one or more of the spools 216 and then exits the shelf 162c at the same location at which it entered the shelf. The jumper cable 162c is then guided up the vertical cable guide to a connector sleeve in another shelf which may be located in the same distribution frame 32 or in a different distribution frame.

Of course, many different optical fiber cable circuit arrangements are possible with the racking and distribution frame systems of the present invention and one of the features of the invention is that with the same basic components the system may easily be adapted or modified to different circuit arrangements and to arrangements handling different numbers of optical fiber cables.

We claim:

1. An adaptive housing for use in an optical fiber cable distribution frame system, said housing comprising a box-like member open along the front thereof, a plurality of shelves arranged in stacked array in said member and mounted for individual movement through said open front from an enclosed position within said member to an access position substantially outside said member, each of said shelves being of substantially the same configuration, and each shelf containing at least one type of optical fiber cable support from a group consisting of cable storage spools, cable splice trays and cable connector support panels, said optical fiber cable support being removable from said shelf and replaceable with another type of optical fiber cable support from said group.

2. An adaptive housing according to claim 1 wherein said shelves are mounted for pivotal movement about a vertical axis near one side of said open front of said housing.

3. An adaptive housing according to claim 2 wherein said housing is formed with an opening for optical fiber cables near the rear of the side thereof opposite said vertical axis.

4. An adaptive housing according to claim 3 wherein at least one of said shelves is formed with an opening for optical fiber cables near said vertical axis.

5. An adaptive housing according to claim 1 wherein at least one of said shelves has mounted thereon a spool for winding a length of optical fiber cable, said spool having a flat base and a cylindrical wall extending up from said base, and a snap fastener extending through said base and through an opening in said shelf.

6. An adaptive housing according to claim 1 wherein at least one of said shelves has mounted thereon a tray for holding a plurality of optical fiber cable splices, said tray having a flat base and at least one snap fastener extending through said base and through an opening in said shelf.

7. An adaptive housing according to claim 1 wherein at least one of said shelves has mounted thereon a panel with fiber optic connector sleeves, said plate extending across the shelf and held in slots formed in opposite sides of the shelf.

8. An adaptive housing according to claim 1 wherein at least one of said shelves has openings therein for fastening thereto, alternatively, optical fiber cable storage spools, a tray for holding a plurality of optical fiber cable splices and a panel configured to hold optical fiber cable connectors.

9. An optical fiber cable support assembly comprising a housing of box-like configuration and open at the front thereof, a shelf mounted on said housing to pivot about an axis which extends along one side of the front of the housing to move from an enclosed position inside said housing to an access position substantially fully outside said housing, said housing being formed with an optical fiber cable opening located substantially diagonally across said housing from said axis through which an optical fiber cable can extend, and a cable abutment formation on said shelf at a location thereon which, when said shelf is at said enclosed position, is further from the front of said housing than a line extending from said axis to said optical fiber cable opening.

10. An optical fiber cable support assembly according to claim 9 wherein said cable abutment formation is a cable storage spool.

11. An optical fiber cable support assembly according to claim 9 wherein said cable abutment formation is located on said shelf at a maximum distance from said line.

12. An optical fiber cable support assembly according to claim 9 wherein an optical fiber cable extends directly from said optical fiber cable opening to the side of said abutment which is farthest from said line.

13. A tray for holding optical fiber cable splices in a manner to provide convenient access to modify the cable splices and to permit secure storage of said splices, said tray comprising a flat expensive bottom wall, an upright vertical circumferential wall extending up from said bottom wall at a location inwardly from its outer edges, said circumferential wall being formed with an opening to permit optical fiber cables to pass through to the region surrounded by said wall, flanges extending outwardly from the upper edge of said circumferential wall, at least one raised formation located in a region surrounded by said circumferential wall which defines, together with said circumferential wall, a channel for guiding buffer portions of optical fiber cables and an optical fiber cable splice holder mounting formation located within said region in communication with said channel.

14. A tray according to claim 13 wherein at least one cable clamp is located on said bottom wall near said opening in said circumferential wall.

15. A tray according to claim 13 wherein said raised formation further forms an optical fiber cable splice holder mounting means in the region within said circumferential wall and along the path of said channel.

16. A tray according to claim 15 wherein said splice holder mounting means includes a spring latch for permitting removal of a splice holder from said tray.

17. A tray according to claim 15 wherein said splice holder mounting means is formed by two raised formations within the region surrounded by said circumferential wall.

18. A tray according to claim 13 wherein said bottom wall is provided with snap fasteners for securing said tray to a moveable shelf in a fiber optical cable housing.

19. A tray according to claim 18 wherein said snap fasteners are provided at opposite ends of one edge of said bottom wall and wherein tabs are formed to extend out from the opposite edge of said bottom wall to project into slots formed in a moveable shelf to which said tray can be mounted.

* * * * *

UNITED STATES PATENT AND TRADEMARK OFFICE
CERTIFICATE OF CORRECTION

PATENT NO. : 5,100,221
DATED : March 31, 1992
INVENTOR(S) : WILLIAM V. CARNEY ET AL.

It is certified that error appears in the above-identified patent and that said Letters Patent is hereby corrected as shown below:

Title Page:
AT [75] INVENTORS

"Carl Meyerhoefer," should read --Carl H. Meyerhoefer,--.

SHEET 1 OF 17

Fig. 1, insert section line --2-2-- positioned to indicate a view looking toward one end of the system;

Fig. 22, insert section line --27-27-- positioned to indicate a view looking upwardly from the bottom of the figure;

SHEET 3 OF 17

Fig. 4, insert section line --5-5-- positioned to indicate a view looking upwardly from the bottom of the figure;

SHEET 4 OF 17

Fig. 5, insert section line --6-6-- positioned to indicate a side view of the frame;

SHEET 11 OF 17

Fig. 15, insert section line --27-27-- positioned to indicte a fragmentary section through one of the snap fasteners 199;

UNITED STATES PATENT AND TRADEMARK OFFICE
CERTIFICATE OF CORRECTION

PATENT NO. : 5,100,221

DATED : March 31, 1992

INVENTOR(S) : WILLIAM V. CARNEY ET AL.

It is certified that error appears in the above-identified patent and that said Letters Patent is hereby corrected as shown below:

COLUMN 5

Line 11, "trough shaped" should read --trough-shaped--.
Line 19, "trough shaped" should read --trough-shaped--.
Line 24, "trough shaped" should read --trough-shaped--.

COLUMN 8

Line 10, "one piece" should read --one-piece--.
Line 56, "t he" should read --the--.

COLUMN 11

Line 40, "well known" should read --well-known--.
Line 64, "cam shaped" should read --cam-shaped--.
Line 68, "cam shaped" should read --cam-shaped--.

COLUMN 13

Line 37, "therefore" should read --therefor--.

COLUMN 15

Line 29, "hand" should read --handled--.
Line 63, "formations 44" should read --formations 244--.

COLUMN 16

Line 7, "tray 22." should read --tray 222.--.
Line 44, "holder 278" should read --hole 278--.

UNITED STATES PATENT AND TRADEMARK OFFICE
CERTIFICATE OF CORRECTION

PATENT NO. : 5,100,221
DATED : March 31, 1992
INVENTOR(S) : WILLIAM V. CARNEY ET AL.

It is certified that error appears in the above-identified patent and that said Letters Patent is hereby corrected as shown below:

COLUMN 17

Line 10, "higher" should read --larger--.

COLUMN 18

Line 33, "said plate" should read --said panel--.
Line 53, "further" should read --farther--.

COLUMN 19

Line 2, "expensive" should read --expansive--.

Signed and Sealed this

Twentieth Day of October, 1992

Attest:

DOUGLAS B. COMER

*Attesting Officer*     *Acting Commissioner of Patents and Trademarks*